(12) United States Patent
Heslin et al.

(10) Patent No.: US 7,994,471 B2
(45) Date of Patent: *Aug. 9, 2011

(54) INTERIOR REARVIEW MIRROR SYSTEM WITH FORWARDLY-VIEWING CAMERA

(75) Inventors: Patrick Heslin, Dublin (IE); Niall R. Lynam, Holland, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/026,591

(22) Filed: Feb. 14, 2011

(65) Prior Publication Data

US 2011/0134553 A1     Jun. 9, 2011

Related U.S. Application Data

(63) Continuation of application No. 12/467,660, filed on May 18, 2009, now Pat. No. 7,888,629, which is a continuation of application No. 12/197,660, filed on Aug. 25, 2008, now Pat. No. 7,538,316, which is a continuation of application No. 11/828,880, filed on Jul. 26, 2007, now Pat. No. 7,420,159, which is a continuation of application No. 11/699,271, filed on Jan. 29, 2007, now Pat. No. 7,265,342, which is a continuation of application No. 11/418,906, filed on May 5, 2006, now Pat. No. 7,262,406, which is a continuation of application No. 10/913,748, filed on Aug. 6, 2004, now Pat. No. 7,041,965, which is a continuation of application No. 10/618,334, filed on Jul. 11, 2003, now Pat. No. 6,774,356, which is a continuation of application No. 09/997,579, filed on Nov. 29, 2001, now Pat. No. 6,593,565, which is a continuation of application No. 09/433,467, filed on Nov. 4, 1999, now Pat. No. 6,326,613, which is a continuation-in-part of application No. 09/003,966, filed on Jan. 7, 1998, now Pat. No. 6,250,148.

(51) Int. Cl.
   *H01J 5/02* (2006.01)
(52) U.S. Cl. .................................... 250/239; 250/208.1
(58) Field of Classification Search .................. 250/239, 250/208.1, 216, 227.25; 359/229–242; 340/461, 340/485, 602
   See application file for complete search history.

(56) References Cited

U.S. PATENT DOCUMENTS
1,096,452 A     5/1914     Perrin
(Continued)

FOREIGN PATENT DOCUMENTS
AU     A-40317/95     2/1995
(Continued)

OTHER PUBLICATIONS

Stewart, James W.; HP SnapLED: LED Assemblies for Automotive Signal Applications; Nov. 1, 1998; Hewlett-Packard Journal; vol. 50, No. 1, www.hpl.hp.com/hpjournal/98nov/nov98al.pdf.

(Continued)

*Primary Examiner* — Que T Le
(74) *Attorney, Agent, or Firm* — Van Dyke, Gardner, Linn & Burkhart, LLP

(57) ABSTRACT

A vehicular interior rearview mirror system includes an attachment element attached at an in-cabin surface of a vehicle windshield and an interior rearview mirror assembly that includes a structure that includes a mount for attaching the mirror assembly to the attachment element, a pivot element, and an interior rearview mirror head pivotally attached at the pivot element. The interior rearview mirror head is adjustable by a driver of the vehicle about the pivot element to adjust a rearward field of view. At least one accessory is encompassed by the structure of the mirror assembly. The structure covers the at least one accessory from view by the driver operating the vehicle. One of the accessories is a forwardly-viewing camera and, with the interior rearview mirror assembly attached to the attachment element, the forwardly-viewing camera views through the vehicle windshield.

82 Claims, 5 Drawing Sheets

U.S. PATENT DOCUMENTS

| | | |
|---|---|---|
| 1,563,258 A | 11/1925 | Cunningham |
| 2,069,368 A | 2/1937 | Horinstein |
| 2,166,303 A | 7/1939 | Hodny et al. |
| 2,263,382 A | 11/1941 | Gotzinger |
| 2,414,223 A | 1/1947 | DeVirgilis |
| 2,457,348 A | 12/1948 | Chambers |
| 2,561,582 A | 7/1951 | Marbel |
| 2,580,014 A | 12/1951 | Gazda |
| 3,004,473 A | 10/1961 | Arthur et al. |
| 3,075,430 A | 1/1963 | Woodward et al. |
| 3,141,393 A | 7/1964 | Platt |
| 3,152,216 A | 10/1964 | Woodward |
| 3,162,008 A | 12/1964 | Berger et al. |
| 3,185,020 A | 5/1965 | Thelen |
| 3,266,016 A | 8/1966 | Maruyama et al. |
| 3,280,701 A | 10/1966 | Donnelly et al. |
| 3,432,225 A | 3/1969 | Rock |
| 3,451,741 A | 6/1969 | Manos |
| 3,453,038 A | 7/1969 | Kissa et al. |
| 3,467,465 A | 9/1969 | Van Noord |
| 3,473,867 A | 10/1969 | Byrnes |
| 3,480,781 A | 11/1969 | Mandalakas |
| 3,499,112 A | 3/1970 | Heilmeier et al. |
| 3,499,702 A | 3/1970 | Goldmacher et al. |
| 3,521,941 A | 7/1970 | Deb et al. |
| 3,543,018 A | 11/1970 | Barcus et al. |
| 3,557,265 A | 1/1971 | Chisholm et al. |
| 3,565,985 A | 2/1971 | Schrenk et al. |
| 3,612,654 A | 10/1971 | Klein |
| 3,614,210 A | 10/1971 | Caplan |
| 3,628,851 A | 12/1971 | Robertson |
| 3,676,668 A | 7/1972 | Collins et al. |
| 3,680,951 A | 8/1972 | Jordan et al. |
| 3,689,695 A | 9/1972 | Rosenfield et al. |
| 3,711,176 A | 1/1973 | Alfrey, Jr. et al. |
| 3,712,710 A | 1/1973 | Castellion et al. |
| 3,748,017 A | 7/1973 | Yamamura et al. |
| 3,781,090 A | 12/1973 | Sumita |
| 3,806,229 A | 4/1974 | Schoot et al. |
| 3,807,832 A | 4/1974 | Castellion |
| 3,807,833 A | 4/1974 | Graham et al. |
| 3,821,590 A | 6/1974 | Kosman et al. |
| 3,837,129 A | 9/1974 | Losell |
| 3,860,847 A | 1/1975 | Carley |
| 3,862,798 A | 1/1975 | Hopkins |
| 3,870,404 A | 3/1975 | Wilson et al. |
| 3,876,287 A | 4/1975 | Sprokel |
| 3,932,024 A | 1/1976 | Yaguchi et al. |
| 3,940,822 A | 3/1976 | Emerick et al. |
| 3,956,017 A | 5/1976 | Shigemasa |
| 3,978,190 A | 8/1976 | Kurz, Jr. et al. |
| 3,985,424 A | 10/1976 | Steinacher |
| 4,006,546 A | 2/1977 | Anderson et al. |
| 4,035,681 A | 7/1977 | Savage |
| 4,040,727 A | 8/1977 | Ketchpel |
| 4,052,712 A | 10/1977 | Ohama et al. |
| 4,075,468 A | 2/1978 | Marcus |
| 4,088,400 A | 5/1978 | Assouline et al. |
| 4,093,364 A | 6/1978 | Miller |
| 4,097,131 A | 6/1978 | Nishiyama |
| 4,109,235 A | 8/1978 | Bouthors |
| 4,139,234 A | 2/1979 | Morgan |
| 4,159,866 A | 7/1979 | Wunsch et al. |
| 4,161,653 A | 7/1979 | Bedini et al. |
| 4,171,875 A | 10/1979 | Taylor et al. |
| 4,174,152 A | 11/1979 | Gilia et al. |
| 4,200,361 A | 4/1980 | Malvano et al. |
| 4,202,607 A | 5/1980 | Washizuka et al. |
| 4,211,955 A | 7/1980 | Ray |
| 4,214,266 A | 7/1980 | Myers |
| 4,219,760 A | 8/1980 | Ferro |
| 4,221,955 A | 9/1980 | Joslyn |
| 4,228,490 A | 10/1980 | Thillays |
| 4,247,870 A | 1/1981 | Gabel et al. |
| 4,254,931 A * | 3/1981 | Aikens et al. ................ 248/549 |
| 4,257,703 A | 3/1981 | Goodrich |
| 4,274,078 A | 6/1981 | Isobe et al. |
| 4,277,804 A | 7/1981 | Robison |
| 4,281,899 A | 8/1981 | Oskam |
| 4,288,814 A | 9/1981 | Talley et al. |
| RE30,835 E | 12/1981 | Giglia |
| 4,306,768 A | 12/1981 | Egging |
| 4,310,851 A | 1/1982 | Pierrat |
| 4,331,382 A | 5/1982 | Graff |
| 4,338,000 A | 7/1982 | Kamimori et al. |
| 4,377,613 A | 3/1983 | Gordon |
| 4,398,805 A | 8/1983 | Cole |
| 4,419,386 A | 12/1983 | Gordon |
| 4,420,238 A | 12/1983 | Felix |
| 4,425,717 A | 1/1984 | Marcus |
| 4,435,042 A | 3/1984 | Wood et al. |
| 4,435,048 A | 3/1984 | Kamimori et al. |
| 4,436,371 A | 3/1984 | Wood et al. |
| 4,438,348 A | 3/1984 | Casper et al. |
| 4,443,057 A | 4/1984 | Bauer et al. |
| 4,446,171 A | 5/1984 | Thomas |
| 4,465,339 A | 8/1984 | Baucke et al. |
| 4,473,695 A | 9/1984 | Wrighton et al. |
| 4,490,227 A | 12/1984 | Bitter |
| 4,491,390 A | 1/1985 | Tong-Shen |
| 4,499,451 A | 2/1985 | Suzuki et al. |
| 4,521,079 A | 6/1985 | Leenhouts et al. |
| 4,524,941 A | 6/1985 | Wood et al. |
| 4,538,063 A | 8/1985 | Bulat |
| 4,546,551 A | 10/1985 | Franks |
| 4,555,694 A | 11/1985 | Yanagishima et al. |
| 4,561,625 A | 12/1985 | Weaver |
| 4,572,619 A | 2/1986 | Reininger et al. |
| 4,580,196 A | 4/1986 | Task |
| 4,581,827 A | 4/1986 | Higashi |
| 4,588,267 A | 5/1986 | Pastore |
| 4,603,946 A | 8/1986 | Kato et al. |
| 4,623,222 A | 11/1986 | Itoh et al. |
| 4,625,210 A | 11/1986 | Sagl |
| 4,626,850 A | 12/1986 | Chey |
| 4,630,040 A | 12/1986 | Haertling |
| 4,630,109 A | 12/1986 | Barton |
| 4,630,904 A | 12/1986 | Pastore |
| 4,634,835 A | 1/1987 | Suzuki |
| 4,635,033 A | 1/1987 | Inukai et al. |
| 4,636,782 A | 1/1987 | Nakamura et al. |
| 4,638,287 A | 1/1987 | Umebayashi et al. |
| 4,646,210 A | 2/1987 | Skogler et al. |
| 4,652,090 A | 3/1987 | Uchikawa et al. |
| 4,655,549 A | 4/1987 | Suzuki et al. |
| 4,665,311 A | 5/1987 | Cole |
| 4,665,430 A | 5/1987 | Hiroyasu |
| 4,669,827 A | 6/1987 | Fukada et al. |
| 4,671,615 A | 6/1987 | Fukada et al. |
| 4,671,619 A | 6/1987 | Kamimori et al. |
| 4,678,281 A | 7/1987 | Bauer |
| 4,679,906 A | 7/1987 | Brandenburg |
| 4,682,083 A | 7/1987 | Alley |
| 4,692,798 A | 9/1987 | Seko et al. |
| 4,694,295 A | 9/1987 | Miller et al. |
| 4,697,883 A | 10/1987 | Suzuki et al. |
| 4,701,022 A | 10/1987 | Jacob |
| 4,702,566 A | 10/1987 | Tukude et al. |
| 4,711,544 A | 12/1987 | Iino et al. |
| 4,712,879 A | 12/1987 | Lynam et al. |
| 4,713,685 A | 12/1987 | Nishimura et al. |
| RE32,576 E | 1/1988 | Pastore |
| 4,718,756 A | 1/1988 | Lancaster |
| 4,721,364 A | 1/1988 | Itoh et al. |
| 4,729,068 A | 3/1988 | Ohe |
| 4,729,076 A | 3/1988 | Masami et al. |
| 4,731,669 A | 3/1988 | Hayashi et al. |
| 4,733,335 A | 3/1988 | Serizawa et al. |
| 4,733,336 A | 3/1988 | Skogler et al. |
| 4,740,838 A | 4/1988 | Mase et al. |
| 4,761,061 A | 8/1988 | Nishiyama et al. |
| 4,773,740 A | 9/1988 | Kawakami et al. |
| 4,780,752 A | 10/1988 | Angerstein et al. |
| 4,781,436 A | 11/1988 | Armbruster |
| 4,789,904 A | 12/1988 | Peterson |
| 4,793,690 A | 12/1988 | Gahan et al. |
| 4,793,695 A | 12/1988 | Wada et al. |

| | | | | | | |
|---|---|---|---|---|---|---|
| 4,794,261 | A | 12/1988 | Rosen | 5,076,673 | A | 12/1991 | Lynam et al. |
| D299,491 | S | 1/1989 | Masuda | 5,076,674 | A | 12/1991 | Lynam |
| 4,799,768 | A | 1/1989 | Gahan | 5,078,480 | A | 1/1992 | Warszawski |
| 4,803,599 | A | 2/1989 | Trine et al. | 5,096,287 | A | 3/1992 | Kakinami et al. |
| 4,807,096 | A | 2/1989 | Skogler et al. | 5,100,095 | A | 3/1992 | Haan et al. |
| 4,820,933 | A | 4/1989 | Hong et al. | 5,101,139 | A | 3/1992 | Lechter |
| 4,825,232 | A | 4/1989 | Howdle | 5,105,127 | A | 4/1992 | Lavaud et al. |
| 4,826,289 | A | 5/1989 | Vandenbrink et al. | 5,115,346 | A | 5/1992 | Lynam |
| 4,827,086 | A | 5/1989 | Rockwell | 5,117,346 | A | 5/1992 | Gard |
| 4,837,551 | A | 6/1989 | Iino | 5,119,220 | A | 6/1992 | Narita et al. |
| 4,842,378 | A | 6/1989 | Flasck et al. | 5,121,200 | A | 6/1992 | Choi |
| 4,845,402 | A | 7/1989 | Smith | 5,122,619 | A | 6/1992 | Dlubak |
| 4,847,772 | A | 7/1989 | Michalopoulos et al. | 5,123,077 | A | 6/1992 | Endo et al. |
| 4,855,161 | A | 8/1989 | Moser et al. | 5,124,845 | A | 6/1992 | Shimojo |
| 4,855,550 | A | 8/1989 | Schultz, Jr. | 5,124,890 | A | 6/1992 | Choi et al. |
| 4,859,813 | A | 8/1989 | Rockwell | 5,128,799 | A | 7/1992 | Byker |
| 4,859,867 | A | 8/1989 | Larson et al. | 5,130,898 | A | 7/1992 | Akahane |
| 4,860,171 | A | 8/1989 | Kojima | 5,131,154 | A | 7/1992 | Schierbeek et al. |
| 4,862,594 | A | 9/1989 | Schierbeek et al. | 5,134,507 | A | 7/1992 | Ishii |
| 4,871,917 | A | 10/1989 | O'Farrell et al. | 5,134,549 | A | 7/1992 | Yokoyama |
| 4,872,051 | A | 10/1989 | Dye | 5,135,298 | A | 8/1992 | Feltman |
| 4,882,466 | A | 11/1989 | Friel | 5,136,483 | A | 8/1992 | Schöniger et al. |
| 4,882,565 | A | 11/1989 | Gallmeyer | 5,140,455 | A | 8/1992 | Varaprasad et al. |
| 4,883,349 | A | 11/1989 | Mittelhäuser | 5,140,465 | A | 8/1992 | Yasui et al. |
| 4,884,135 | A | 11/1989 | Schiffman | 5,142,407 | A | 8/1992 | Varaprasad et al. |
| 4,886,960 | A | 12/1989 | Molyneux et al. | 5,145,609 | A | 9/1992 | Varaprasad et al. |
| 4,889,412 | A | 12/1989 | Clerc et al. | 5,150,232 | A | 9/1992 | Gunkima et al. |
| 4,891,828 | A | 1/1990 | Kawazoe | 5,151,816 | A | 9/1992 | Varaprasad et al. |
| 4,892,345 | A | 1/1990 | Rachael, III | 5,151,824 | A | 9/1992 | O'Farrell |
| 4,902,103 | A | 2/1990 | Miyake et al. | 5,154,617 | A | 10/1992 | Suman et al. |
| 4,902,108 | A | 2/1990 | Byker | 5,158,638 | A | 10/1992 | Osanami et al. |
| 4,906,085 | A | 3/1990 | Sugihara et al. | 5,160,200 | A | 11/1992 | Cheselske |
| 4,909,606 | A | 3/1990 | Wada et al. | 5,160,201 | A | 11/1992 | Wrobel |
| 4,910,591 | A | 3/1990 | Petrossian et al. | 5,168,378 | A | 12/1992 | Black et al. |
| 4,916,374 | A | 4/1990 | Schierbeek et al. | 5,173,881 | A | 12/1992 | Sindle |
| 4,926,170 | A | 5/1990 | Beggs et al. | 5,177,031 | A | 1/1993 | Buchmann et al. |
| 4,930,742 | A | 6/1990 | Schofield et al. | 5,178,448 | A | 1/1993 | Adams et al. |
| 4,933,814 | A | 6/1990 | Sanai | 5,179,471 | A | 1/1993 | Caskey et al. |
| 4,935,665 | A | 6/1990 | Murata | 5,183,099 | A | 2/1993 | Bechu |
| 4,936,533 | A | 6/1990 | Adams et al. | 5,184,956 | A | 2/1993 | Langlarais et al. |
| 4,937,796 | A | 6/1990 | Tendler | 5,189,537 | A | 2/1993 | O'Farrell |
| 4,937,945 | A | 7/1990 | Schofield et al. | 5,193,029 | A | 3/1993 | Schofield et al. |
| 4,943,796 | A | 7/1990 | Lee | 5,197,562 | A | 3/1993 | Kakinama et al. |
| 4,948,242 | A | 8/1990 | Desmond et al. | 5,202,950 | A | 4/1993 | Arego et al. |
| 4,953,305 | A | 9/1990 | Van Lente et al. | 5,207,492 | A | 5/1993 | Roberts |
| 4,956,591 | A | 9/1990 | Schierbeek et al. | 5,210,967 | A | 5/1993 | Brown |
| 4,957,349 | A | 9/1990 | Clerc et al. | 5,212,819 | A | 5/1993 | Wada |
| 4,959,247 | A | 9/1990 | Moser et al. | 5,214,408 | A | 5/1993 | Asayama |
| 4,959,865 | A | 9/1990 | Stettiner et al. | 5,217,794 | A | 6/1993 | Schrenk |
| 4,970,653 | A | 11/1990 | Kenue | 5,223,814 | A | 6/1993 | Suman |
| 4,973,844 | A | 11/1990 | O'Farrell et al. | 5,223,844 | A | 6/1993 | Mansell et al. |
| 4,974,122 | A | 11/1990 | Shaw | 5,229,975 | A | 7/1993 | Truesdell et al. |
| 4,978,196 | A | 12/1990 | Suzuki et al. | 5,230,400 | A | 7/1993 | Kakinama et al. |
| 4,983,951 | A | 1/1991 | Igarashi et al. | 5,233,461 | A | 8/1993 | Dornan et al. |
| 4,985,809 | A | 1/1991 | Matsui et al. | 5,235,316 | A | 8/1993 | Qualizza |
| 4,987,357 | A | 1/1991 | Masaki | 5,239,405 | A | 8/1993 | Varaprasad et al. |
| 4,996,083 | A | 2/1991 | Moser et al. | 5,239,406 | A | 8/1993 | Lynam |
| 5,001,386 | A | 3/1991 | Sullivan et al. | 5,243,417 | A | 9/1993 | Pollard |
| 5,001,558 | A | 3/1991 | Burley et al. | 5,245,422 | A | 9/1993 | Borcherts et al. |
| 5,005,213 | A | 4/1991 | Hanson et al. | 5,252,354 | A | 10/1993 | Cronin et al. |
| 5,006,971 | A | 4/1991 | Jenkins | 5,253,109 | A | 10/1993 | O'Farrell et al. |
| 5,014,167 | A | 5/1991 | Roberts | 5,255,442 | A | 10/1993 | Schierbeek et al. |
| 5,016,988 | A | 5/1991 | Iimura | 5,260,626 | A | 11/1993 | Takase et al. |
| 5,016,996 | A | 5/1991 | Ueno | 5,277,986 | A | 1/1994 | Cronin et al. |
| 5,017,903 | A | 5/1991 | Krippelz, Sr. | 5,280,555 | A | 1/1994 | Ainsburg |
| 5,018,839 | A | 5/1991 | Yamamoto et al. | 5,285,060 | A | 2/1994 | Larson et al. |
| 5,027,200 | A | 6/1991 | Petrossian et al. | 5,289,321 | A | 2/1994 | Secor |
| 5,037,182 | A | 8/1991 | Groves et al. | 5,296,924 | A | 3/1994 | de Saint Blancard et al. |
| 5,038,255 | A | 8/1991 | Nashihashi et al. | 5,303,075 | A | 4/1994 | Wada et al. |
| 5,052,163 | A | 10/1991 | Czekala | 5,303,205 | A | 4/1994 | Gauthier et al. |
| 5,056,899 | A | 10/1991 | Warszawski | 5,304,980 | A | 4/1994 | Maekawa |
| 5,057,974 | A | 10/1991 | Mizobe | 5,305,012 | A | 4/1994 | Faris |
| 5,058,851 | A | 10/1991 | Lawlor et al. | 5,307,136 | A | 4/1994 | Saneyoshi |
| 5,059,015 | A | 10/1991 | Tran | 5,313,335 | A | 5/1994 | Gray et al. |
| 5,066,108 | A | 11/1991 | McDonald | 5,325,096 | A | 6/1994 | Pakett |
| 5,066,112 | A | 11/1991 | Lynam et al. | 5,325,386 | A | 6/1994 | Jewell et al. |
| 5,069,535 | A | 12/1991 | Baucke et al. | 5,327,288 | A | 7/1994 | Wellington et al. |
| 5,070,323 | A | 12/1991 | Iino et al. | 5,330,149 | A | 7/1994 | Haan et al. |
| 5,073,012 | A | 12/1991 | Lynam | 5,331,312 | A | 7/1994 | Kudoh |

| | | | | | |
|---|---|---|---|---|---|
| 5,331,358 A | 7/1994 | Schurle et al. | 5,561,333 A | 10/1996 | Darius |
| 5,339,075 A | 8/1994 | Abst et al. | 5,566,224 A | 10/1996 | ul Azam et al. |
| 5,339,529 A | 8/1994 | Lindberg | 5,567,360 A | 10/1996 | Varaprasad et al. |
| 5,341,437 A | 8/1994 | Nakayama | 5,568,316 A | 10/1996 | Schrenck et al. |
| D351,370 S | 10/1994 | Lawlor et al. | 5,570,127 A | 10/1996 | Schmidt |
| 5,354,965 A | 10/1994 | Lee | 5,572,354 A | 11/1996 | Desmond et al. |
| 5,355,118 A | 10/1994 | Fukuhara | 5,574,426 A | 11/1996 | Shisgal et al. |
| 5,355,245 A | 10/1994 | Lynam | 5,574,443 A | 11/1996 | Hsieh |
| 5,355,284 A | 10/1994 | Roberts | 5,575,552 A | 11/1996 | Faloon et al. |
| 5,361,190 A | 11/1994 | Roberts et al. | 5,576,687 A | 11/1996 | Blank et al. |
| 5,363,294 A | 11/1994 | Yamamoto et al. | 5,576,854 A | 11/1996 | Schmidt et al. |
| 5,371,659 A | 12/1994 | Pastrick et al. | 5,576,975 A | 11/1996 | Sasaki et al. |
| 5,373,482 A | 12/1994 | Gauthier | 5,578,404 A | 11/1996 | Kliem |
| 5,379,146 A | 1/1995 | Defendini | 5,587,236 A | 12/1996 | Agrawal et al. |
| 5,386,285 A | 1/1995 | Asayama | 5,587,699 A | 12/1996 | Faloon et al. |
| 5,386,306 A | 1/1995 | Gunjima et al. | 5,593,221 A | 1/1997 | Evanicky et al. |
| 5,400,158 A | 3/1995 | Ohnishi et al. | 5,594,222 A | 1/1997 | Caldwell |
| 5,402,103 A | 3/1995 | Tashiro | 5,594,560 A | 1/1997 | Jelley et al. |
| 5,406,395 A | 4/1995 | Wilson et al. | 5,594,615 A | 1/1997 | Spijkerman et al. |
| 5,406,414 A | 4/1995 | O'Farrell et al. | 5,602,542 A | 2/1997 | Widmann et al. |
| 5,408,353 A | 4/1995 | Nichols et al. | 5,602,670 A | 2/1997 | Keegan |
| 5,408,357 A | 4/1995 | Beukema | 5,608,550 A | 3/1997 | Epstein et al. |
| 5,410,346 A | 4/1995 | Saneyoshi et al. | 5,609,652 A | 3/1997 | Yamada et al. |
| 5,414,439 A | 5/1995 | Groves et al. | 5,610,380 A | 3/1997 | Nicolaisen |
| 5,414,461 A | 5/1995 | Kishi et al. | 5,610,756 A | 3/1997 | Lynam et al. |
| 5,416,313 A | 5/1995 | Larson et al. | 5,611,966 A | 3/1997 | Varaprasad et al. |
| 5,416,478 A | 5/1995 | Morinaga | 5,614,885 A | 3/1997 | Van Lente et al. |
| 5,418,610 A | 5/1995 | Fischer | 5,615,023 A | 3/1997 | Yang |
| 5,422,756 A | 6/1995 | Weber | 5,615,857 A | 4/1997 | Hook |
| 5,424,726 A | 6/1995 | Beymer | 5,617,085 A | 4/1997 | Tsutsumi et al. |
| 5,424,865 A | 6/1995 | Lynam | 5,619,374 A | 4/1997 | Roberts |
| 5,424,952 A | 6/1995 | Asayama | 5,619,375 A | 4/1997 | Roberts |
| 5,426,524 A | 6/1995 | Wada et al. | 5,626,800 A | 5/1997 | Williams et al. |
| 5,430,431 A | 7/1995 | Nelson | 5,631,089 A | 5/1997 | Center, Jr. et al. |
| 5,432,496 A | 7/1995 | Lin | 5,631,638 A | 5/1997 | Kaspar et al. |
| 5,432,626 A | 7/1995 | Sasuga et al. | 5,631,639 A | 5/1997 | Hibino et al. |
| 5,436,741 A | 7/1995 | Crandall | 5,632,092 A | 5/1997 | Blank et al. |
| 5,437,931 A | 8/1995 | Tsai et al. | 5,632,551 A | 5/1997 | Roney et al. |
| 5,439,305 A | 8/1995 | Santo | 5,634,709 A | 6/1997 | Iwama |
| 5,444,478 A | 8/1995 | Lelong et al. | 5,640,216 A | 6/1997 | Hasegawa et al. |
| 5,446,576 A | 8/1995 | Lynam et al. | 5,642,238 A | 6/1997 | Sala |
| 5,455,716 A | 10/1995 | Suman et al. | 5,644,851 A | 7/1997 | Blank et al. |
| 5,461,361 A | 10/1995 | Moore | 5,646,614 A | 7/1997 | Abersfelder et al. |
| D363,920 S | 11/1995 | Roberts et al. | 5,649,756 A | 7/1997 | Adams et al. |
| 5,469,298 A | 11/1995 | Suman et al. | 5,649,758 A | 7/1997 | Dion |
| 5,475,366 A | 12/1995 | Van Lente et al. | 5,650,765 A | 7/1997 | Park |
| 5,475,494 A | 12/1995 | Nishida et al. | 5,650,929 A | 7/1997 | Potter et al. |
| 5,481,409 A | 1/1996 | Roberts | 5,661,455 A | 8/1997 | Van Lente et al. |
| 5,483,453 A | 1/1996 | Uemura et al. | 5,661,651 A | 8/1997 | Geschke et al. |
| 5,485,161 A | 1/1996 | Vaughn | 5,661,804 A | 8/1997 | Dykema et al. |
| 5,485,378 A | 1/1996 | Franke et al. | 5,662,375 A | 9/1997 | Adams et al. |
| 5,487,522 A | 1/1996 | Hook | 5,666,157 A | 9/1997 | Aviv |
| 5,488,496 A | 1/1996 | Pine | 5,667,289 A | 9/1997 | Akahane et al. |
| 5,497,305 A | 3/1996 | Pastrick et al. | 5,668,663 A | 9/1997 | Varaprasad et al. |
| 5,497,306 A | 3/1996 | Pastrick | 5,668,675 A | 9/1997 | Fredricks |
| 5,500,760 A | 3/1996 | Varaprasad et al. | 5,669,698 A | 9/1997 | Veldman et al. |
| 5,506,701 A | 4/1996 | Ichikawa | 5,669,699 A | 9/1997 | Pastrick et al. |
| 5,509,606 A | 4/1996 | Breithaupt et al. | 5,669,704 A | 9/1997 | Pastrick |
| 5,510,983 A | 4/1996 | Iino | 5,669,705 A | 9/1997 | Pastrick et al. |
| 5,515,448 A | 5/1996 | Nishitani | 5,670,935 A | 9/1997 | Schofield et al. |
| 5,519,621 A | 5/1996 | Worthman | 5,671,996 A | 9/1997 | Bos et al. |
| 5,521,744 A | 5/1996 | Mazurek | 5,673,994 A | 10/1997 | Fant, Jr. et al. |
| 5,521,760 A | 5/1996 | DeYoung et al. | 5,673,999 A | 10/1997 | Koenck |
| 5,523,811 A | 6/1996 | Wada et al. | 5,677,598 A | 10/1997 | De Hair et al. |
| 5,523,877 A | 6/1996 | Lynam | 5,679,283 A | 10/1997 | Tonar et al. |
| 5,525,264 A | 6/1996 | Cronin et al. | 5,680,123 A | 10/1997 | Lee |
| 5,525,977 A | 6/1996 | Suman | 5,680,245 A | 10/1997 | Lynam |
| 5,528,422 A | 6/1996 | Roberts | 5,680,263 A | 10/1997 | Zimmermann et al. |
| 5,528,474 A | 6/1996 | Roney et al. | 5,686,975 A | 11/1997 | Lipton |
| 5,529,138 A | 6/1996 | Shaw et al. | 5,686,979 A | 11/1997 | Weber et al. |
| 5,530,240 A | 6/1996 | Larson et al. | 5,689,241 A | 11/1997 | Clarke, Sr. et al. |
| 5,530,420 A | 6/1996 | Tsuchiya et al. | 5,689,370 A | 11/1997 | Tonar et al. |
| 5,530,421 A | 6/1996 | Marshall et al. | 5,691,848 A | 11/1997 | Van Lente et al. |
| 5,535,056 A | 7/1996 | Caskey et al. | 5,692,819 A | 12/1997 | Mitsutake et al. |
| 5,535,144 A | 7/1996 | Kise | 5,696,529 A | 12/1997 | Evanicky et al. |
| 5,539,397 A | 7/1996 | Asanuma et al. | 5,696,567 A | 12/1997 | Wada et al. |
| 5,541,590 A | 7/1996 | Nishio | 5,699,044 A | 12/1997 | Van Lente et al. |
| 5,550,677 A | 8/1996 | Schofield et al. | 5,699,188 A | 12/1997 | Gilbert et al. |
| 5,555,172 A | 9/1996 | Potter | 5,703,568 A | 12/1997 | Hegyi |

| | | | | | |
|---|---|---|---|---|---|
| 5,708,410 A | 1/1998 | Blank et al. | 5,879,074 A | 3/1999 | Pastrick |
| 5,708,415 A | 1/1998 | Van Lente et al. | 5,883,605 A | 3/1999 | Knapp |
| 5,708,857 A | 1/1998 | Ishibashi | 5,883,739 A | 3/1999 | Ashihara et al. |
| 5,715,093 A | 2/1998 | Schierbeek et al. | 5,888,431 A | 3/1999 | Tonar et al. |
| 5,724,187 A | 3/1998 | Varaprasad et al. | D409,540 S | 5/1999 | Muth |
| 5,724,316 A | 3/1998 | Brunts | 5,899,551 A | 5/1999 | Neijzen et al. |
| 5,729,194 A | 3/1998 | Spears et al. | 5,899,956 A | 5/1999 | Chan |
| 5,737,226 A | 4/1998 | Olson et al. | 5,904,729 A | 5/1999 | Ruzicka |
| 5,741,966 A | 4/1998 | Handfield et al. | 5,910,854 A | 6/1999 | Varaprasad et al. |
| 5,744,227 A | 4/1998 | Bright et al. | 5,914,815 A | 6/1999 | Bos |
| 5,745,050 A | 4/1998 | Nakagawa | 5,917,664 A | 6/1999 | O'Neill et al. |
| 5,745,266 A | 4/1998 | Smith | 5,918,180 A | 6/1999 | Dimino |
| 5,748,172 A | 5/1998 | Song et al. | 5,922,176 A | 7/1999 | Caskey |
| 5,748,287 A | 5/1998 | Takahashi et al. | 5,923,027 A | 7/1999 | Stam et al. |
| 5,751,211 A | 5/1998 | Shirai et al. | 5,923,457 A | 7/1999 | Byker et al. |
| 5,751,246 A | 5/1998 | Hertel | 5,924,212 A | 7/1999 | Domanski |
| 5,751,390 A | 5/1998 | Crawford et al. | 5,926,087 A | 7/1999 | Busch et al. |
| 5,751,489 A | 5/1998 | Caskey et al. | 5,927,792 A | 7/1999 | Welling et al. |
| 5,754,099 A | 5/1998 | Nishimura et al. | 5,928,572 A | 7/1999 | Tonar et al. |
| D394,833 S | 6/1998 | Muth | 5,929,786 A | 7/1999 | Schofield et al. |
| 5,760,828 A | 6/1998 | Cortes | 5,931,555 A | 8/1999 | Akahane et al. |
| 5,760,931 A | 6/1998 | Saburi et al. | 5,935,702 A | 8/1999 | Macquart et al. |
| 5,760,962 A | 6/1998 | Schofield et al. | 5,938,320 A | 8/1999 | Crandall |
| 5,761,094 A | 6/1998 | Olson et al. | 5,938,321 A | 8/1999 | Bos et al. |
| 5,762,823 A | 6/1998 | Hikmet | 5,938,721 A | 8/1999 | Dussell et al. |
| 5,764,139 A | 6/1998 | Nojima et al. | 5,940,011 A | 8/1999 | Agravante et al. |
| 5,765,940 A | 6/1998 | Levy et al. | 5,940,120 A | 8/1999 | Frankhouse et al. |
| 5,767,793 A | 6/1998 | Agravante et al. | 5,940,201 A | 8/1999 | Ash et al. |
| 5,768,020 A | 6/1998 | Nagao | 5,942,895 A | 8/1999 | Popovic et al. |
| 5,775,762 A | 7/1998 | Vitito | 5,947,586 A | 9/1999 | Weber |
| 5,777,779 A | 7/1998 | Hashimoto et al. | 5,949,331 A | 9/1999 | Schofield et al. |
| 5,780,160 A | 7/1998 | Allemand et al. | 5,956,079 A | 9/1999 | Ridgley |
| 5,786,772 A | 7/1998 | Schofield et al. | 5,956,181 A | 9/1999 | Lin |
| 5,788,357 A | 8/1998 | Muth et al. | 5,959,367 A | 9/1999 | O'Farrell et al. |
| 5,790,298 A | 8/1998 | Tonar | 5,959,555 A | 9/1999 | Furuta |
| 5,790,973 A | 8/1998 | Blaker et al. | 5,959,577 A | 9/1999 | Fan et al. |
| 5,793,308 A | 8/1998 | Rosinski et al. | 5,963,247 A | 10/1999 | Banitt |
| 5,793,420 A | 8/1998 | Schmidt | 5,965,247 A | 10/1999 | Jonza et al. |
| 5,796,094 A | 8/1998 | Schofield et al. | 5,968,538 A | 10/1999 | Snyder, Jr. |
| 5,796,176 A | 8/1998 | Kramer et al. | 5,971,552 A | 10/1999 | O'Farrell et al. |
| 5,798,057 A | 8/1998 | Hikmet | 5,973,760 A | 10/1999 | Dehmlow |
| 5,798,575 A | 8/1998 | O'Farrell et al. | 5,975,715 A | 11/1999 | Bauder |
| 5,798,688 A | 8/1998 | Schofield | 5,984,482 A | 11/1999 | Rumsey et al. |
| 5,800,918 A | 9/1998 | Chartier et al. | 5,986,730 A | 11/1999 | Hansen et al. |
| 5,802,727 A | 9/1998 | Blank et al. | 5,990,469 A | 11/1999 | Bechtel et al. |
| 5,803,579 A | 9/1998 | Turnbull et al. | 5,990,625 A | 11/1999 | Meissner et al. |
| 5,805,330 A | 9/1998 | Byker et al. | 5,995,180 A | 11/1999 | Moriwaki et al. |
| 5,805,367 A | 9/1998 | Kanazawa | 5,998,617 A | 12/1999 | Srinivasa et al. |
| 5,806,879 A | 9/1998 | Hamada et al. | 5,998,929 A | 12/1999 | Bechtel et al. |
| 5,806,965 A | 9/1998 | Deese | 6,000,823 A | 12/1999 | Desmond et al. |
| 5,808,197 A | 9/1998 | Dao | 6,001,486 A | 12/1999 | Varaprasad et al. |
| 5,808,566 A | 9/1998 | Behr et al. | 6,002,511 A | 12/1999 | Varaprasad et al. |
| 5,808,589 A | 9/1998 | Fergason | 6,002,544 A | 12/1999 | Yatsu |
| 5,808,713 A | 9/1998 | Broer et al. | 6,002,983 A | 12/1999 | Alland et al. |
| 5,808,777 A | 9/1998 | Lynam et al. | 6,005,724 A | 12/1999 | Todd |
| 5,808,778 A | 9/1998 | Bauer et al. | 6,007,222 A | 12/1999 | Thau |
| 5,812,321 A | 9/1998 | Schierbeek et al. | 6,008,486 A | 12/1999 | Stam et al. |
| 5,813,745 A | 9/1998 | Fant, Jr. et al. | 6,008,871 A | 12/1999 | Okumura |
| 5,818,625 A | 10/1998 | Forgette et al. | 6,009,359 A | 12/1999 | El-Hakim et al. |
| 5,820,097 A | 10/1998 | Spooner | 6,016,035 A | 1/2000 | Eberspächer et al. |
| 5,820,245 A | 10/1998 | Desmond et al. | 6,016,215 A | 1/2000 | Byker |
| 5,822,023 A | 10/1998 | Suman et al. | 6,019,411 A | 2/2000 | Carter et al. |
| 5,823,654 A | 10/1998 | Pastrick et al. | 6,019,475 A | 2/2000 | Lynam et al. |
| 5,825,527 A | 10/1998 | Forgette et al. | 6,020,987 A | 2/2000 | Baumann et al. |
| 5,835,166 A | 11/1998 | Hall et al. | 6,021,371 A | 2/2000 | Fultz |
| 5,837,994 A | 11/1998 | Stam et al. | 6,023,229 A | 2/2000 | Bugno et al. |
| 5,844,505 A | 12/1998 | Van Ryzin | 6,025,872 A | 2/2000 | Ozaki et al. |
| 5,848,373 A | 12/1998 | DeLorme et al. | 6,028,537 A | 2/2000 | Suman et al. |
| 5,850,176 A | 12/1998 | Kinoshita et al. | 6,037,689 A | 3/2000 | Bingle et al. |
| 5,850,205 A | 12/1998 | Blouin | 6,040,939 A | 3/2000 | Demiryont et al. |
| 5,863,116 A | 1/1999 | Pastrick et al. | 6,042,253 A | 3/2000 | Fant, Jr. et al. |
| 5,864,419 A | 1/1999 | Lynam | 6,042,934 A | 3/2000 | Guiselin et al. |
| 5,867,801 A | 2/1999 | Denny | 6,045,243 A | 4/2000 | Muth et al. |
| 5,871,275 A | 2/1999 | O'Farrell et al. | 6,045,643 A | 4/2000 | Byker et al. |
| 5,871,843 A | 2/1999 | Yoneda et al. | 6,046,766 A | 4/2000 | Sakata |
| 5,877,707 A | 3/1999 | Kowalick | 6,046,837 A | 4/2000 | Yamamoto |
| 5,877,897 A | 3/1999 | Schofield et al. | 6,049,171 A | 4/2000 | Stam et al. |
| 5,878,353 A | 3/1999 | ul Azam et al. | D425,466 S | 5/2000 | Todd et al. |
| 5,878,370 A | 3/1999 | Olson | 6,060,989 A | 5/2000 | Gehlot |

| | | | | | | |
|---|---|---|---|---|---|---|
| 6,061,002 | A | 5/2000 | Weber et al. | 6,164,564 A | 12/2000 | Franco et al. |
| 6,062,920 | A | 5/2000 | Jordan et al. | 6,166,625 A | 12/2000 | Teowee et al. |
| 6,064,508 | A | 5/2000 | Forgette et al. | 6,166,629 A | 12/2000 | Hamma et al. |
| 6,065,840 | A | 5/2000 | Caskey et al. | 6,166,834 A | 12/2000 | Taketomi et al. |
| 6,066,920 | A | 5/2000 | Torihara et al. | 6,166,847 A | 12/2000 | Tench et al. |
| 6,067,111 | A | 5/2000 | Hahn et al. | 6,166,848 A | 12/2000 | Cammenga et al. |
| 6,067,500 | A | 5/2000 | Morimoto et al. | 6,167,255 A | 12/2000 | Kennedy, III et al. |
| 6,068,380 | A | 5/2000 | Lynn et al. | 6,167,755 B1 | 1/2001 | Damson et al. |
| D426,506 | S | 6/2000 | Todd et al. | 6,169,955 B1 | 1/2001 | Fultz |
| D426,507 | S | 6/2000 | Todd et al. | 6,170,956 B1 | 1/2001 | Rumsey et al. |
| D427,128 | S | 6/2000 | Mathieu | 6,172,600 B1 | 1/2001 | Kakinami et al. |
| 6,072,391 | A | 6/2000 | Suzukie et al. | 6,172,601 B1 | 1/2001 | Wada et al. |
| 6,074,077 | A | 6/2000 | Pastrick et al. | 6,172,613 B1 | 1/2001 | DeLine et al. |
| 6,074,777 | A | 6/2000 | Reimers et al. | 6,173,501 B1 | 1/2001 | Blank et al. |
| 6,076,948 | A | 6/2000 | Bukosky et al. | 6,175,164 B1 | 1/2001 | O'Farrell et al. |
| 6,078,355 | A | 6/2000 | Zengel | 6,175,300 B1 | 1/2001 | Kendrick |
| 6,078,865 | A | 6/2000 | Koyanagi | 6,176,602 B1 | 1/2001 | Pastrick et al. |
| D428,372 | S | 7/2000 | Todd et al. | 6,178,034 B1 | 1/2001 | Allemand et al. |
| D428,373 | S | 7/2000 | Todd et al. | 6,178,377 B1 | 1/2001 | Ishihara et al. |
| 6,082,881 | A | 7/2000 | Hicks | 6,181,387 B1 | 1/2001 | Rosen |
| 6,084,700 | A | 7/2000 | Knapp et al. | 6,182,006 B1 | 1/2001 | Meek |
| 6,086,131 | A | 7/2000 | Bingle et al. | 6,183,119 B1 | 2/2001 | Desmond et al. |
| 6,086,229 | A | 7/2000 | Pastrick | 6,184,679 B1 | 2/2001 | Popovic et al. |
| 6,087,012 | A | 7/2000 | Varaprasad et al. | 6,184,781 B1 | 2/2001 | Ramakesavan |
| 6,087,953 | A | 7/2000 | DeLine et al. | 6,185,492 B1 | 2/2001 | Kagawa et al. |
| 6,091,343 | A | 7/2000 | Dykema et al. | 6,185,501 B1 | 2/2001 | Smith et al. |
| 6,093,976 | A | 7/2000 | Kramer et al. | 6,188,505 B1 | 2/2001 | Lomprey et al. |
| 6,094,618 | A | 7/2000 | Harada | 6,191,704 B1 | 2/2001 | Takenaga et al. |
| D428,842 | S | 8/2000 | Todd et al. | 6,193,912 B1 | 2/2001 | Thieste et al. |
| D429,202 | S | 8/2000 | Todd et al. | 6,195,194 B1 | 2/2001 | Roberts et al. |
| D430,088 | S | 8/2000 | Todd et al. | 6,196,688 B1 | 3/2001 | Caskey et al. |
| 6,097,023 | A | 8/2000 | Schofield et al. | 6,198,409 B1 | 3/2001 | Schofield et al. |
| 6,097,316 | A | 8/2000 | Liaw et al. | 6,199,014 B1 | 3/2001 | Walker et al. |
| 6,099,131 | A | 8/2000 | Fletcher et al. | 6,199,810 B1 | 3/2001 | Wu et al. |
| 6,099,155 | A | 8/2000 | Pastrick et al. | 6,200,010 B1 | 3/2001 | Anders |
| 6,102,546 | A | 8/2000 | Carter | 6,201,642 B1 | 3/2001 | Bos |
| 6,102,559 | A | 8/2000 | Nold et al. | 6,206,553 B1 | 3/2001 | Boddy et al. |
| 6,104,552 | A | 8/2000 | Thau et al. | 6,207,083 B1 | 3/2001 | Varaprasad et al. |
| 6,106,121 | A | 8/2000 | Buckley et al. | 6,210,008 B1 | 4/2001 | Hoekstra et al. |
| 6,111,498 | A | 8/2000 | Jobes, I et al. | 6,210,012 B1 | 4/2001 | Broer |
| 6,111,683 | A | 8/2000 | Cammenga et al. | 6,212,470 B1 | 4/2001 | Seymour et al. |
| 6,111,684 | A | 8/2000 | Forgette et al. | 6,217,181 B1 | 4/2001 | Lynam et al. |
| 6,111,685 | A | 8/2000 | Tench et al. | 6,218,934 B1 | 4/2001 | Regan |
| 6,111,696 | A | 8/2000 | Allen et al. | 6,222,447 B1 | 4/2001 | Schofield et al. |
| 6,115,086 | A | 9/2000 | Rosen | 6,222,460 B1 | 4/2001 | DeLine et al. |
| 6,115,651 | A | 9/2000 | Cruz | 6,222,689 B1 | 4/2001 | Higuchi et al. |
| 6,116,743 | A | 9/2000 | Hoek | 6,227,689 B1 | 5/2001 | Miller |
| 6,118,219 | A | 9/2000 | Okigami et al. | 6,232,937 B1 | 5/2001 | Jacobsen et al. |
| 6,122,597 | A | 9/2000 | Saneyoshi et al. | 6,239,851 B1 | 5/2001 | Hatazawa et al. |
| 6,122,921 | A | 9/2000 | Brezoczky et al. | 6,239,898 B1 | 5/2001 | Byker et al. |
| 6,124,647 | A | 9/2000 | Marcus et al. | 6,239,899 B1 | 5/2001 | DeVries et al. |
| 6,124,886 | A | 9/2000 | DeLine et al. | 6,243,003 B1 | 6/2001 | DeLine et al. |
| 6,127,919 | A | 10/2000 | Wylin | 6,244,716 B1 | 6/2001 | Steenwyk et al. |
| 6,127,945 | A | 10/2000 | Mura-Smith | 6,245,262 B1 | 6/2001 | Varaprasad et al. |
| 6,128,576 | A | 10/2000 | Nishimoto et al. | 6,247,820 B1 | 6/2001 | Van Order |
| 6,130,421 | A | 10/2000 | Bechtel et al. | 6,249,214 B1 | 6/2001 | Kashiwazaki |
| 6,130,448 | A | 10/2000 | Bauer et al. | 6,249,310 B1 | 6/2001 | Lefkowitz |
| 6,132,072 | A | 10/2000 | Turnbull et al. | 6,249,369 B1 | 6/2001 | Theiste et al. |
| 6,137,620 | A | 10/2000 | Guarr et al. | 6,250,148 B1 | 6/2001 | Lynam |
| 6,139,171 | A | 10/2000 | Waldmann | 6,250,766 B1 | 6/2001 | Strumolo et al. |
| 6,139,172 | A | 10/2000 | Bos et al. | 6,250,783 B1 | 6/2001 | Stidham et al. |
| 6,140,933 | A | 10/2000 | Bugno et al. | 6,255,639 B1 | 7/2001 | Stam et al. |
| 6,142,656 | A | 11/2000 | Kurth | 6,257,746 B1 | 7/2001 | Todd et al. |
| 6,146,003 | A | 11/2000 | Thau | 6,259,412 B1 | 7/2001 | Duroux |
| 6,147,934 | A | 11/2000 | Arikawa et al. | 6,259,475 B1 | 7/2001 | Ramachandran et al. |
| 6,148,261 | A | 11/2000 | Obradovich et al. | 6,260,608 B1 | 7/2001 | Kim |
| 6,149,287 | A | 11/2000 | Pastrick et al. | 6,262,842 B1 | 7/2001 | Ouderkirk et al. |
| 6,150,014 | A | 11/2000 | Chu et al. | 6,264,353 B1 | 7/2001 | Caraher et al. |
| 6,151,065 | A | 11/2000 | Steed et al. | 6,265,968 B1 | 7/2001 | Betzitza et al. |
| 6,151,539 | A | 11/2000 | Bergholz et al. | 6,268,803 B1 | 7/2001 | Gunderson et al. |
| 6,152,551 | A | 11/2000 | Annas | 6,268,837 B1 | 7/2001 | Kobayashi et al. |
| 6,152,590 | A | 11/2000 | Fürst et al. | 6,269,308 B1 | 7/2001 | Kodaka et al. |
| 6,154,149 | A | 11/2000 | Tyckowski et al. | 6,271,901 B1 | 8/2001 | Ide et al. |
| 6,154,306 | A | 11/2000 | Varaprasad et al. | 6,274,221 B2 | 8/2001 | Smith et al. |
| 6,157,294 | A | 12/2000 | Urai et al. | 6,276,821 B1 | 8/2001 | Pastrick et al. |
| 6,157,418 | A | 12/2000 | Rosen | 6,276,822 B1 | 8/2001 | Bedrosian et al. |
| 6,157,480 | A | 12/2000 | Anderson et al. | 6,277,471 B1 | 8/2001 | Tang |
| 6,158,655 | A | 12/2000 | DeVries, Jr. et al. | 6,278,271 B1 | 8/2001 | Schott |
| 6,161,865 | A | 12/2000 | Rose et al. | 6,278,377 B1 | 8/2001 | DeLine et al. |

| | | |
|---|---|---|
| 6,278,941 B1 | 8/2001 | Yokoyama |
| 6,280,068 B1 | 8/2001 | Mertens et al. |
| 6,280,069 B1 | 8/2001 | Pastrick et al. |
| 6,281,804 B1 | 8/2001 | Haller et al. |
| 6,286,965 B1 | 9/2001 | Caskey et al. |
| 6,286,984 B1 | 9/2001 | Berg |
| 6,289,332 B2 | 9/2001 | Menig et al. |
| 6,290,378 B1 | 9/2001 | Buchalla et al. |
| 6,291,905 B1 | 9/2001 | Drummond et al. |
| 6,291,906 B1 | 9/2001 | Marcus et al. |
| 6,294,989 B1 | 9/2001 | Schofield et al. |
| 6,296,379 B1 | 10/2001 | Pastrick |
| 6,297,781 B1 | 10/2001 | Turnbull et al. |
| 6,299,333 B1 | 10/2001 | Pastrick et al. |
| 6,300,879 B1 | 10/2001 | Ragan et al. |
| 6,301,039 B1 | 10/2001 | Tench |
| 6,304,173 B2 | 10/2001 | Pala et al. |
| 6,305,807 B1 | 10/2001 | Schierbeek |
| 6,310,611 B1 | 10/2001 | Caldwell |
| 6,310,714 B1 | 10/2001 | Lomprey et al. |
| 6,310,738 B1 | 10/2001 | Chu |
| 6,313,454 B1 | 11/2001 | Bos et al. |
| 6,314,295 B1 | 11/2001 | Kawamoto |
| 6,315,440 B1 | 11/2001 | Satoh |
| 6,317,057 B1 | 11/2001 | Lee |
| 6,317,180 B1 | 11/2001 | Kuroiwa et al. |
| 6,317,248 B1 | 11/2001 | Agrawal et al. |
| 6,318,870 B1 | 11/2001 | Spooner et al. |
| 6,320,176 B1 | 11/2001 | Schofield et al. |
| 6,320,282 B1 | 11/2001 | Caldwell |
| 6,320,612 B1 | 11/2001 | Young |
| 6,324,295 B1 | 11/2001 | Valery et al. |
| 6,326,613 B1 | 12/2001 | Heslin et al. |
| 6,326,900 B2 | 12/2001 | DeLine et al. |
| 6,329,925 B1 | 12/2001 | Skiver et al. |
| 6,330,511 B2 | 12/2001 | Ogura et al. |
| 6,331,066 B1 | 12/2001 | Desmond et al. |
| 6,333,759 B1 | 12/2001 | Mazzilli |
| 6,335,680 B1 | 1/2002 | Matsuoka |
| 6,336,737 B1 | 1/2002 | Thau |
| 6,340,850 B2 | 1/2002 | O'Farrell et al. |
| 6,341,523 B2 | 1/2002 | Lynam |
| 6,344,805 B1 | 2/2002 | Yasui et al. |
| 6,346,698 B1 | 2/2002 | Turnbull |
| 6,347,880 B1 | 2/2002 | Fürst et al. |
| 6,348,858 B2 | 2/2002 | Weis et al. |
| 6,351,708 B1 | 2/2002 | Takagi et al. |
| 6,353,392 B1 | 3/2002 | Schofield et al. |
| 6,356,206 B1 | 3/2002 | Takenaga et al. |
| 6,356,376 B1 | 3/2002 | Tonar et al. |
| 6,356,389 B1 | 3/2002 | Nilsen et al. |
| 6,357,883 B1 | 3/2002 | Strumolo et al. |
| 6,362,121 B1 | 3/2002 | Chopin et al. |
| 6,362,548 B1 | 3/2002 | Bingle et al. |
| 6,363,326 B1 | 3/2002 | Scully |
| 6,366,013 B1 | 4/2002 | Leenders et al. |
| 6,366,213 B2 | 4/2002 | DeLine et al. |
| 6,370,329 B1 | 4/2002 | Teuchert |
| 6,371,636 B1 | 4/2002 | Wesson |
| 6,379,013 B1 | 4/2002 | Bechtel et al. |
| 6,379,788 B2 | 4/2002 | Choi et al. |
| 6,382,805 B1 | 5/2002 | Miyabukuro |
| 6,385,139 B1 | 5/2002 | Arikawa et al. |
| 6,386,742 B1 | 5/2002 | DeLine et al. |
| 6,390,529 B1 | 5/2002 | Bingle et al. |
| 6,390,626 B2 | 5/2002 | Knox |
| 6,390,635 B2 | 5/2002 | Whitehead et al. |
| 6,396,397 B1 | 5/2002 | Bos et al. |
| 6,396,637 B2 | 5/2002 | Roest et al. |
| 6,407,468 B1 | 6/2002 | LeVesque et al. |
| 6,407,847 B1 | 6/2002 | Poll et al. |
| 6,408,247 B1 | 6/2002 | Ichikawa et al. |
| 6,411,204 B1 | 6/2002 | Bloomfield et al. |
| 6,412,959 B1 | 7/2002 | Tseng |
| 6,412,973 B1 | 7/2002 | Bos et al. |
| 6,414,910 B1 | 7/2002 | Kaneko et al. |
| 6,415,230 B1 | 7/2002 | Maruko et al. |
| 6,416,208 B2 | 7/2002 | Pastrick et al. |
| 6,417,786 B2 | 7/2002 | Learman et al. |
| 6,418,376 B1 | 7/2002 | Olson |
| 6,419,300 B1 | 7/2002 | Pavao et al. |
| 6,420,036 B1 | 7/2002 | Varaprasad et al. |
| 6,420,800 B1 | 7/2002 | LeVesque et al. |
| 6,420,975 B1 | 7/2002 | DeLine et al. |
| 6,421,081 B1 | 7/2002 | Markus |
| 6,424,272 B1 | 7/2002 | Gutta et al. |
| 6,424,273 B1 | 7/2002 | Gutta et al. |
| 6,424,892 B1 | 7/2002 | Matsuoka |
| 6,426,492 B1 | 7/2002 | Bos et al. |
| 6,426,568 B2 | 7/2002 | Turnbull et al. |
| 6,427,349 B1 | 8/2002 | Blank et al. |
| 6,428,172 B1 | 8/2002 | Hutzel et al. |
| 6,433,676 B2 | 8/2002 | DeLine et al. |
| 6,433,680 B1 | 8/2002 | Ho |
| 6,433,914 B1 | 8/2002 | Lomprey et al. |
| 6,437,688 B1 | 8/2002 | Kobayashi |
| 6,438,491 B1 | 8/2002 | Farmer |
| 6,439,755 B1 | 8/2002 | Fant, Jr. et al. |
| 6,441,872 B1 | 8/2002 | Ho |
| 6,441,943 B1 | 8/2002 | Roberts et al. |
| 6,441,963 B2 | 8/2002 | Murakami et al. |
| 6,441,964 B1 | 8/2002 | Chu et al. |
| 6,445,287 B1 | 9/2002 | Schofield et al. |
| 6,447,128 B1 | 9/2002 | Lang et al. |
| 6,449,082 B1 | 9/2002 | Agrawal et al. |
| 6,452,533 B1 | 9/2002 | Yamabuchi et al. |
| 6,462,795 B1 | 10/2002 | Clarke |
| 6,463,369 B2 | 10/2002 | Sadano et al. |
| 6,466,701 B1 | 10/2002 | Ejiri et al. |
| 6,471,362 B1 | 10/2002 | Carter et al. |
| 6,472,977 B1 | 10/2002 | Pöchmüller |
| 6,472,979 B2 | 10/2002 | Schofield et al. |
| 6,473,001 B1 | 10/2002 | Blum |
| 6,474,853 B2 | 11/2002 | Pastrick et al. |
| 6,476,731 B1 | 11/2002 | Miki et al. |
| 6,477,460 B2 | 11/2002 | Kepler |
| 6,477,464 B2 | 11/2002 | McCarthy et al. |
| 6,483,429 B1 | 11/2002 | Yasui et al. |
| 6,483,438 B2 | 11/2002 | DeLine et al. |
| 6,483,613 B1 | 11/2002 | Woodgate et al. |
| 6,487,500 B2 | 11/2002 | Lemelson et al. |
| 6,494,602 B2 | 12/2002 | Pastrick et al. |
| 6,498,620 B2 | 12/2002 | Schofield et al. |
| 6,501,387 B2 | 12/2002 | Skiver et al. |
| 6,512,203 B2 | 1/2003 | Jones et al. |
| 6,512,624 B2 | 1/2003 | Tonar et al. |
| 6,513,252 B2 | 2/2003 | Schierbeek et al. |
| 6,515,581 B1 | 2/2003 | Ho |
| 6,515,582 B1 | 2/2003 | Teowee |
| 6,515,597 B1 | 2/2003 | Wada et al. |
| 6,516,664 B2 | 2/2003 | Lynam |
| 6,519,209 B1 | 2/2003 | Arikawa et al. |
| 6,520,667 B1 | 2/2003 | Mousseau |
| 6,522,451 B1 | 2/2003 | Lynam |
| 6,522,969 B2 | 2/2003 | Kannonji |
| 6,525,707 B1 | 2/2003 | Kaneko et al. |
| 6,534,884 B2 | 3/2003 | Marcus et al. |
| 6,538,709 B1 | 3/2003 | Kurihara et al. |
| 6,539,306 B2 | 3/2003 | Turnbull et al. |
| 6,542,085 B1 | 4/2003 | Yang |
| 6,542,182 B1 | 4/2003 | Chautorash |
| 6,543,163 B1 | 4/2003 | Ginsberg |
| 6,545,598 B1 | 4/2003 | de Villeroche |
| 6,549,253 B1 | 4/2003 | Robbie et al. |
| 6,549,335 B1 | 4/2003 | Trapani et al. |
| 6,550,949 B1 | 4/2003 | Bauer et al. |
| 6,552,326 B2 | 4/2003 | Turnbull |
| 6,553,308 B1 | 4/2003 | Uhlmann et al. |
| 6,559,902 B1 | 5/2003 | Kusuda et al. |
| 6,560,004 B2 | 5/2003 | Theiste et al. |
| 6,560,027 B2 | 5/2003 | Meine |
| 6,566,821 B2 | 5/2003 | Nakatsuka et al. |
| 6,567,060 B1 | 5/2003 | Sekiguchi |
| 6,568,839 B1 | 5/2003 | Pastrick et al. |
| 6,572,233 B1 | 6/2003 | Northman et al. |
| 6,573,957 B1 | 6/2003 | Suzuki |
| 6,573,963 B2 | 6/2003 | Ouderkirk et al. |
| 6,575,643 B2 | 6/2003 | Takashashi |

| | | | | | | |
|---|---|---|---|---|---|---|
| 6,580,373 B1 | 6/2003 | Ohashi | | 6,727,807 B2 | 4/2004 | Trajkovic et al. |
| 6,580,479 B1 | 6/2003 | Sekiguchi et al. | | 6,727,808 B1 | 4/2004 | Uselmann et al. |
| 6,580,562 B2 | 6/2003 | Aoki et al. | | 6,727,844 B1 | 4/2004 | Zimmermann et al. |
| 6,581,007 B2 | 6/2003 | Hasegawa et al. | | 6,731,332 B1 | 5/2004 | Yasui et al. |
| 6,583,730 B2 | 6/2003 | Lang et al. | | 6,734,807 B2 | 5/2004 | King |
| 6,591,192 B2 | 7/2003 | Okamura et al. | | 6,736,526 B2 | 5/2004 | Matsuba et al. |
| 6,592,230 B2 | 7/2003 | Dupay | | 6,737,629 B2 | 5/2004 | Nixon et al. |
| 6,593,565 B2 | 7/2003 | Heslin et al. | | 6,737,630 B2 | 5/2004 | Turnbull |
| 6,593,984 B2 | 7/2003 | Arakawa et al. | | 6,737,964 B2 | 5/2004 | Samman et al. |
| 6,594,065 B2 | 7/2003 | Byker et al. | | 6,738,088 B1 | 5/2004 | Uskolovsky et al. |
| 6,594,067 B2 | 7/2003 | Poll et al. | | 6,742,904 B2 | 6/2004 | Bechtel et al. |
| 6,594,090 B2 | 7/2003 | Kruschwitz et al. | | 6,744,353 B2 | 6/2004 | Sjönell |
| 6,594,583 B2 | 7/2003 | Ogura et al. | | 6,746,775 B1 | 6/2004 | Boire et al. |
| 6,594,614 B2 | 7/2003 | Studt et al. | | 6,747,716 B2 | 6/2004 | Kuroiwa et al. |
| 6,595,649 B2 | 7/2003 | Hoekstra et al. | | 6,748,211 B1 | 6/2004 | Isaac et al. |
| 6,597,489 B1 | 7/2003 | Guarr et al. | | 6,749,308 B1 | 6/2004 | Niendorf et al. |
| 6,606,183 B2 | 8/2003 | Ikai et al. | | 6,755,542 B2 | 6/2004 | Bechtel et al. |
| 6,611,202 B2 | 8/2003 | Schofield et al. | | 6,756,912 B2 | 6/2004 | Skiver et al. |
| 6,611,227 B1 | 8/2003 | Nebiyeloul-Kifle et al. | | 6,757,039 B2 | 6/2004 | Ma |
| 6,611,759 B2 | 8/2003 | Brosche | | 6,757,109 B2 | 6/2004 | Bos |
| 6,614,387 B1 | 9/2003 | Deadman | | D493,131 S | 7/2004 | Lawlor et al. |
| 6,614,579 B2 | 9/2003 | Roberts et al. | | D493,394 S | 7/2004 | Lawlor et al. |
| 6,615,438 B1 | 9/2003 | Franco et al. | | 6,759,113 B1 | 7/2004 | Tang |
| 6,616,313 B2 | 9/2003 | Fürst et al. | | 6,759,945 B2 | 7/2004 | Richard |
| 6,616,764 B2 | 9/2003 | Krämer et al. | | 6,760,157 B1 | 7/2004 | Allen et al. |
| 6,618,672 B2 | 9/2003 | Sasaki et al. | | 6,773,116 B2 | 8/2004 | De Vaan et al. |
| 6,621,616 B1 | 9/2003 | Bauer et al. | | 6,774,356 B2 | 8/2004 | Heslin et al. |
| 6,624,936 B2 | 9/2003 | Kotchick et al. | | 6,774,810 B2 | 8/2004 | DeLine et al. |
| 6,627,918 B2 | 9/2003 | Getz et al. | | 6,778,904 B2 | 8/2004 | Iwami et al. |
| 6,630,888 B2 | 10/2003 | Lang et al. | | 6,779,900 B1 | 8/2004 | Nolan-Brown |
| 6,636,190 B2 | 10/2003 | Hirakata et al. | | 6,784,129 B2 | 8/2004 | Seto et al. |
| 6,636,258 B2 | 10/2003 | Strumolo | | 6,797,396 B1 | 9/2004 | Liu et al. |
| 6,638,582 B1 | 10/2003 | Uchiyama et al. | | 6,800,871 B2 | 10/2004 | Matsuda et al. |
| 6,639,360 B2 | 10/2003 | Roberts et al. | | 6,801,283 B2 | 10/2004 | Koyama et al. |
| 6,642,840 B2 | 11/2003 | Lang et al. | | 6,805,474 B2 | 10/2004 | Walser et al. |
| 6,642,851 B2 | 11/2003 | DeLine et al. | | 6,806,452 B2 | 10/2004 | Bos et al. |
| 6,646,697 B1 | 11/2003 | Sekiguchi et al. | | 6,810,323 B1 | 10/2004 | Bullock et al. |
| 6,648,477 B2 | 11/2003 | Hutzel et al. | | 6,812,907 B1 | 11/2004 | Gennetten et al. |
| 6,650,457 B2 | 11/2003 | Busscher et al. | | 6,819,231 B1 | 11/2004 | Berberich et al. |
| 6,657,607 B1 | 12/2003 | Evanicky et al. | | 6,824,281 B2 | 11/2004 | Schofield et al. |
| 6,657,708 B1 | 12/2003 | Bechtel et al. | | 6,831,268 B2 | 12/2004 | Bechtel et al. |
| 6,661,482 B2 | 12/2003 | Hara | | 6,832,848 B2 | 12/2004 | Pastrick |
| 6,661,830 B1 | 12/2003 | Reed et al. | | 6,834,969 B2 | 12/2004 | Bade et al. |
| 6,665,592 B2 | 12/2003 | Kodama | | 6,836,725 B2 | 12/2004 | Millington et al. |
| 6,669,109 B2 | 12/2003 | Ivanov et al. | | 6,842,276 B2 | 1/2005 | Poll et al. |
| 6,669,285 B1 | 12/2003 | Park et al. | | 6,845,805 B1 | 1/2005 | Köster |
| 6,670,207 B1 | 12/2003 | Roberts | | 6,846,098 B2 | 1/2005 | Bourdelais et al. |
| 6,670,910 B2 | 12/2003 | Delcheccolo et al. | | 6,847,424 B2 | 1/2005 | Gotoh et al. |
| 6,670,941 B2 | 12/2003 | Albu et al. | | 6,847,487 B2 | 1/2005 | Burgner |
| 6,671,080 B2 | 12/2003 | Poll et al. | | 6,848,817 B2 | 2/2005 | Bos et al. |
| 6,672,731 B2 | 1/2004 | Schnell et al. | | 6,849,165 B2 | 2/2005 | Klöppel et al. |
| 6,672,734 B2 | 1/2004 | Lammers | | 6,853,491 B1 | 2/2005 | Ruhle et al. |
| 6,672,744 B2 | 1/2004 | DeLine et al. | | 6,870,655 B1 | 3/2005 | Northman et al. |
| 6,672,745 B1 | 1/2004 | Bauer et al. | | 6,870,656 B2 | 3/2005 | Tonar et al. |
| 6,674,370 B2 | 1/2004 | Rodewald et al. | | 6,871,982 B2 | 3/2005 | Holman et al. |
| 6,675,075 B1 | 1/2004 | Engelsburg et al. | | 6,877,888 B2 | 4/2005 | DeLine et al. |
| 6,678,083 B1 | 1/2004 | Anstee | | 6,882,287 B2 | 4/2005 | Schofield |
| 6,678,614 B2 | 1/2004 | McCarthy et al. | | 6,889,064 B2 | 5/2005 | Baratono et al. |
| 6,679,608 B2 | 1/2004 | Bechtel et al. | | 6,891,563 B2 | 5/2005 | Schofield et al. |
| 6,683,539 B2 | 1/2004 | Trajkovic et al. | | 6,902,284 B2 | 6/2005 | Hutzel et al. |
| 6,683,969 B1 | 1/2004 | Nishigaki et al. | | 6,904,348 B2 | 6/2005 | Drummond et al. |
| 6,685,348 B2 | 2/2004 | Pastrick et al. | | 6,906,632 B2 | 6/2005 | DeLine et al. |
| 6,690,262 B1 | 2/2004 | Winnett | | 6,909,486 B2 | 6/2005 | Wang et al. |
| 6,690,268 B2 | 2/2004 | Schofield et al. | | 6,910,779 B2 | 6/2005 | Abel et al. |
| 6,690,413 B1 | 2/2004 | Moore | | 6,912,396 B2 | 6/2005 | Sziraki et al. |
| 6,690,438 B2 | 2/2004 | Sekiguchi | | 6,916,099 B2 | 7/2005 | Su et al. |
| 6,693,517 B2 | 2/2004 | McCarthy et al. | | 6,922,902 B2 | 8/2005 | Schierbeek et al. |
| 6,693,518 B2 | 2/2004 | Kumata et al. | | 6,928,180 B2 | 8/2005 | Stam et al. |
| 6,693,519 B2 | 2/2004 | Keirstead | | 6,928,366 B2 | 8/2005 | Ockerse et al. |
| 6,693,524 B1 | 2/2004 | Payne | | 6,930,737 B2 | 8/2005 | Weindorf et al. |
| 6,700,692 B2 | 3/2004 | Tonar et al. | | 6,934,067 B2 | 8/2005 | Ash et al. |
| 6,709,136 B2 | 3/2004 | Pastrick et al. | | 6,946,978 B2 | 9/2005 | Schofield |
| 6,713,783 B1 | 3/2004 | Mase et al. | | 6,947,576 B2 | 9/2005 | Stam et al. |
| 6,717,109 B1 | 4/2004 | Macher et al. | | 6,947,577 B2 | 9/2005 | Stam et al. |
| 6,717,610 B1 | 4/2004 | Bos et al. | | 6,949,772 B2 | 9/2005 | Shimizu et al. |
| 6,717,712 B2 | 4/2004 | Lynam et al. | | 6,951,410 B2 | 10/2005 | Parsons |
| 6,719,215 B2 | 4/2004 | Droulliard | | 6,951,681 B2 | 10/2005 | Hartley et al. |
| 6,724,446 B2 | 4/2004 | Motomura et al. | | 6,952,312 B2 | 10/2005 | Weber et al. |
| 6,726,337 B2 | 4/2004 | Whitehead et al. | | 6,958,495 B2 | 10/2005 | Nishijima et al. |

| Patent No. | Kind | Date | Inventor |
|---|---|---|---|
| 6,958,683 | B2 | 10/2005 | Mills et al. |
| 6,961,178 | B2 | 11/2005 | Sugino et al. |
| 6,963,438 | B2 | 11/2005 | Busscher et al. |
| 6,968,273 | B2 | 11/2005 | Ockerse et al. |
| 6,972,888 | B2 | 12/2005 | Poll et al. |
| 6,974,236 | B2 | 12/2005 | Tenmyo |
| 6,975,215 | B2 | 12/2005 | Schofield et al. |
| 6,977,702 | B2 | 12/2005 | Wu |
| 6,980,092 | B2 | 12/2005 | Turnbull et al. |
| 6,985,291 | B2 | 1/2006 | Watson et al. |
| 6,992,718 | B1 | 1/2006 | Takahara |
| 7,001,058 | B2 | 2/2006 | Inditsky |
| 7,004,592 | B2 | 2/2006 | Varaprasad et al. |
| 7,004,593 | B2 | 2/2006 | Weller et al. |
| 7,006,173 | B1 | 2/2006 | Hiyama et al. |
| 7,009,751 | B2 | 3/2006 | Tonar et al. |
| 7,012,543 | B2 | 3/2006 | DeLine et al. |
| 7,038,577 | B2 | 5/2006 | Pawlicki et al. |
| 7,041,965 | B2 | 5/2006 | Heslin et al. |
| 7,042,616 | B2 | 5/2006 | Tonar et al. |
| 7,046,418 | B2 | 5/2006 | Lin et al. |
| 7,046,448 | B2 | 5/2006 | Burgner |
| 7,050,908 | B1 | 5/2006 | Schwartz et al. |
| 7,057,681 | B2 | 6/2006 | Hinata et al. |
| 7,063,893 | B2 | 6/2006 | Hoffman |
| 7,064,882 | B2 | 6/2006 | Tonar et al. |
| 7,074,486 | B2 | 7/2006 | Boire et al. |
| 7,081,810 | B2 | 7/2006 | Henderson et al. |
| 7,092,052 | B2 | 8/2006 | Okamoto et al. |
| 7,095,567 | B2 | 8/2006 | Troxell et al. |
| 7,106,213 | B2 | 9/2006 | White |
| 7,106,392 | B2 | 9/2006 | You |
| 7,108,409 | B2 | 9/2006 | DeLine et al. |
| 7,121,028 | B2 | 10/2006 | Shoen et al. |
| 7,125,131 | B2 | 10/2006 | Olczak |
| 7,130,727 | B2 | 10/2006 | Liu et al. |
| 7,132,064 | B2 | 11/2006 | Li et al. |
| 7,136,091 | B2 | 11/2006 | Ichikawa et al. |
| 7,138,974 | B2 | 11/2006 | Hirakata et al. |
| 7,149,613 | B2 | 12/2006 | Stam et al. |
| 7,151,515 | B2 | 12/2006 | Kim et al. |
| 7,151,997 | B2 | 12/2006 | Uhlmann et al. |
| 7,153,588 | B2 | 12/2006 | McMan et al. |
| 7,154,657 | B2 | 12/2006 | Poll et al. |
| 7,158,881 | B2 | 1/2007 | McCarthy et al. |
| 7,160,017 | B2 | 1/2007 | Lee et al. |
| 7,167,796 | B2 | 1/2007 | Taylor et al. |
| 7,168,830 | B2 | 1/2007 | Pastrick et al. |
| 7,175,291 | B1 | 2/2007 | Li |
| 7,176,790 | B2 | 2/2007 | Yamazaki |
| 7,184,190 | B2 | 2/2007 | McCabe et al. |
| 7,185,995 | B2 | 3/2007 | Hatanaka et al. |
| 7,187,498 | B2 | 3/2007 | Bengoechea et al. |
| 7,188,963 | B2 | 3/2007 | Schofield et al. |
| 7,193,764 | B2 | 3/2007 | Lin et al. |
| 7,195,381 | B2 | 3/2007 | Lynam et al. |
| 7,199,767 | B2 | 4/2007 | Spero |
| 7,206,697 | B2 | 4/2007 | Olney et al. |
| 7,209,277 | B2 | 4/2007 | Tonar et al. |
| 7,215,473 | B2 | 5/2007 | Fleming |
| 7,221,363 | B2 | 5/2007 | Roberts et al. |
| 7,224,324 | B2 | 5/2007 | Quist et al. |
| 7,227,472 | B1 | 6/2007 | Roe |
| 7,230,523 | B2 | 6/2007 | Harter, Jr. et al. |
| 7,232,231 | B2 | 6/2007 | Shih |
| 7,233,304 | B1 | 6/2007 | Aratani et al. |
| 7,235,918 | B2 | 6/2007 | McCullough et al. |
| 7,241,030 | B2 | 7/2007 | Mok et al. |
| 7,241,037 | B2 | 7/2007 | Mathieu et al. |
| 7,245,207 | B1 | 7/2007 | Dayan et al. |
| 7,245,231 | B2 | 7/2007 | Kiefer et al. |
| 7,245,336 | B2 | 7/2007 | Hiyama et al. |
| 7,248,305 | B2 | 7/2007 | Ootsuta et al. |
| 7,251,079 | B2 | 7/2007 | Capaldo et al. |
| 7,255,451 | B2 | 8/2007 | McCabe et al. |
| 7,255,465 | B2 | 8/2007 | DeLine et al. |
| 7,259,036 | B2 | 8/2007 | Borland et al. |
| 7,262,406 | B2 | 8/2007 | Heslin et al. |
| 7,262,916 | B2 | 8/2007 | Kao et al. |
| 7,265,342 | B2 | 9/2007 | Heslin et al. |
| 7,268,841 | B2 | 9/2007 | Kasajima et al. |
| 7,269,327 | B2 | 9/2007 | Tang |
| 7,269,328 | B2 | 9/2007 | Tang |
| 7,271,951 | B2 | 9/2007 | Weber et al. |
| 7,274,501 | B2 | 9/2007 | McCabe et al. |
| 7,281,491 | B2 | 10/2007 | Iwamaru |
| 7,286,280 | B2 | 10/2007 | Whitehead et al. |
| 7,287,868 | B2 | 10/2007 | Carter et al. |
| 7,289,037 | B2 | 10/2007 | Uken et al. |
| 7,290,919 | B2 | 11/2007 | Pan et al. |
| 7,292,208 | B1 | 11/2007 | Park et al. |
| 7,302,344 | B2 | 11/2007 | Olney et al. |
| 7,308,341 | B2 | 12/2007 | Schofield et al. |
| 7,310,177 | B2 | 12/2007 | McCabe et al. |
| 7,311,428 | B2 | 12/2007 | DeLine et al. |
| 7,316,485 | B2 | 1/2008 | Roose |
| 7,317,386 | B2 | 1/2008 | Lengning et al. |
| 7,318,664 | B2 | 1/2008 | Hatanaka et al. |
| 7,323,819 | B2 | 1/2008 | Hong et al. |
| 7,324,043 | B2 | 1/2008 | Purden et al. |
| 7,324,174 | B2 | 1/2008 | Hafuka et al. |
| 7,324,261 | B2 | 1/2008 | Tonar et al. |
| 7,327,225 | B2 | 2/2008 | Nicholas et al. |
| 7,327,226 | B2 | 2/2008 | Turnbull et al. |
| 7,327,855 | B1 | 2/2008 | Chen |
| 7,328,103 | B2 | 2/2008 | McCarthy et al. |
| 7,329,013 | B2 | 2/2008 | Blank et al. |
| 7,329,850 | B2 | 2/2008 | Drummond et al. |
| 7,331,415 | B2 | 2/2008 | Hawes et al. |
| 7,338,177 | B2 | 3/2008 | Lynam |
| 7,344,284 | B2 | 3/2008 | Lynam et al. |
| 7,349,143 | B2 | 3/2008 | Tonar et al. |
| 7,349,582 | B2 | 3/2008 | Takeda et al. |
| 7,355,524 | B2 | 4/2008 | Schofield |
| 7,360,932 | B2 | 4/2008 | Uken et al. |
| 7,362,505 | B2 | 4/2008 | Hikmet et al. |
| 7,368,714 | B2 | 5/2008 | Remillard et al. |
| 7,370,983 | B2 | 5/2008 | DeWind et al. |
| 7,372,611 | B2 | 5/2008 | Tonar et al. |
| 7,375,895 | B2 | 5/2008 | Brynielsson |
| 7,379,224 | B2 | 5/2008 | Tonar et al. |
| 7,379,225 | B2 | 5/2008 | Tonar et al. |
| 7,379,243 | B2 | 5/2008 | Horsten et al. |
| 7,379,814 | B2 | 5/2008 | Ockerse et al. |
| 7,379,817 | B1 | 5/2008 | Tyson et al. |
| 7,380,633 | B2 | 6/2008 | Shen et al. |
| 7,389,171 | B2 | 6/2008 | Rupp |
| 7,391,563 | B2 | 6/2008 | McCabe et al. |
| 7,396,147 | B2 | 7/2008 | Munro |
| 7,411,732 | B2 | 8/2008 | Kao et al. |
| 7,412,328 | B2 | 8/2008 | Uhlmann et al. |
| 7,417,781 | B2 | 8/2008 | Tonar et al. |
| 7,420,159 | B2 | 9/2008 | Heslin et al. |
| 7,446,462 | B2 | 11/2008 | Lim et al. |
| 7,446,650 | B2 | 11/2008 | Schofield et al. |
| 7,446,924 | B2 | 11/2008 | Schofield et al. |
| 7,448,776 | B2 | 11/2008 | Tang |
| 7,452,090 | B2 | 11/2008 | Weller et al. |
| 7,453,057 | B2 | 11/2008 | Drummond et al. |
| 7,455,412 | B2 | 11/2008 | Rottcher |
| 7,460,007 | B2 | 12/2008 | Schofield et al. |
| 7,467,883 | B2 | 12/2008 | DeLine et al. |
| 7,468,651 | B2 | 12/2008 | DeLine et al. |
| 7,471,438 | B2 | 12/2008 | McCabe et al. |
| 7,474,963 | B2 | 1/2009 | Taylor et al. |
| 7,477,439 | B2 | 1/2009 | Tonar et al. |
| 7,480,149 | B2 | 1/2009 | DeWard et al. |
| 7,488,080 | B2 | 2/2009 | Skiver et al. |
| 7,488,099 | B2 | 2/2009 | Fogg et al. |
| 7,489,374 | B2 | 2/2009 | Utsumi et al. |
| 7,490,007 | B2 | 2/2009 | Taylor et al. |
| 7,490,943 | B2 | 2/2009 | Kikuchi et al. |
| 7,490,944 | B2 | 2/2009 | Blank et al. |
| 7,494,231 | B2 | 2/2009 | Varaprasad et al. |
| 7,495,719 | B2 | 2/2009 | Adachi et al. |
| 7,496,439 | B2 | 2/2009 | McCormick |
| 7,502,156 | B2 | 3/2009 | Tonar et al. |
| 7,505,188 | B2 | 3/2009 | Niiyama et al. |

| Patent No. | Date | Inventor |
|---|---|---|
| 7,511,607 B2 | 3/2009 | Hubbard et al. |
| 7,511,872 B2 | 3/2009 | Tonar et al. |
| 7,525,715 B2 | 4/2009 | McCabe et al. |
| 7,526,103 B2 | 4/2009 | Schofield et al. |
| 7,533,998 B2 | 5/2009 | Schofield et al. |
| 7,538,316 B2 | 5/2009 | Heslin et al. |
| 7,540,620 B2 | 6/2009 | Weller et al. |
| 7,541,570 B2 | 6/2009 | Drummond et al. |
| 7,542,193 B2 | 6/2009 | McCabe et al. |
| 7,543,947 B2 | 6/2009 | Varaprasad et al. |
| 7,547,467 B2 | 6/2009 | Olson et al. |
| 7,548,291 B2 | 6/2009 | Lee et al. |
| 7,551,354 B2 | 6/2009 | Horsten et al. |
| 7,561,181 B2 | 7/2009 | Schofield et al. |
| 7,562,985 B2 | 7/2009 | Cortenraad et al. |
| 7,567,291 B2 | 7/2009 | Bechtel et al. |
| 7,571,038 B2 | 8/2009 | Butler et al. |
| 7,571,042 B2 | 8/2009 | Taylor et al. |
| 7,572,490 B2 | 8/2009 | Park et al. |
| 7,579,939 B2 | 8/2009 | Schofield et al. |
| 7,579,940 B2 | 8/2009 | Schofield et al. |
| 7,580,795 B2 | 8/2009 | McCarthy et al. |
| 7,581,859 B2 | 9/2009 | Lynam |
| 7,581,867 B2 | 9/2009 | Lee et al. |
| 7,583,184 B2 | 9/2009 | Schofield et al. |
| 7,586,566 B2 | 9/2009 | Nelson et al. |
| 7,586,666 B2 | 9/2009 | McCabe et al. |
| 7,589,893 B2 | 9/2009 | Rottcher |
| 7,600,878 B2 | 10/2009 | Blank et al. |
| 7,619,508 B2 | 11/2009 | Lynam et al. |
| 7,623,202 B2 | 11/2009 | Araki et al. |
| 7,626,749 B2 | 12/2009 | Baur et al. |
| 7,633,567 B2 | 12/2009 | Yamada et al. |
| 7,636,188 B2 | 12/2009 | Baur et al. |
| 7,636,195 B2 | 12/2009 | Nieuwkerk et al. |
| 7,636,930 B2 | 12/2009 | Chang |
| 7,643,200 B2 | 1/2010 | Varaprasad et al. |
| 7,643,927 B2 | 1/2010 | Hils |
| 7,651,228 B2 | 1/2010 | Skiver et al. |
| 7,658,521 B2 | 2/2010 | DeLine et al. |
| 7,663,798 B2 | 2/2010 | Tonar et al. |
| 7,667,579 B2 | 2/2010 | DeLine et al. |
| 7,670,016 B2 | 3/2010 | Weller et al. |
| 7,688,495 B2 | 3/2010 | Tonar et al. |
| 7,695,174 B2 | 4/2010 | Takayanagi et al. |
| 7,696,964 B2 | 4/2010 | Lankhorst et al. |
| 7,706,046 B2 | 4/2010 | Bauer et al. |
| 7,710,631 B2 | 5/2010 | McCabe et al. |
| 7,711,479 B2 | 5/2010 | Taylor et al. |
| 7,726,822 B2 | 6/2010 | Blank et al. |
| 7,728,276 B2 | 6/2010 | Drummond et al. |
| 7,728,721 B2 | 6/2010 | Schofield et al. |
| 7,728,927 B2 | 6/2010 | Nieuwkerk et al. |
| 7,734,392 B2 | 6/2010 | Schofield et al. |
| 7,746,534 B2 | 6/2010 | Tonar et al. |
| 7,787,077 B2 | 8/2010 | Kondoh et al. |
| 7,791,694 B2 | 9/2010 | Molsen et al. |
| 7,830,583 B2 | 11/2010 | Neuman et al. |
| 7,842,154 B2 | 11/2010 | Lynam |
| 7,871,169 B2 | 1/2011 | Varaprasad et al. |
| 2001/0019356 A1 | 9/2001 | Takeda et al. |
| 2001/0022616 A1 | 9/2001 | Rademacher et al. |
| 2001/0026215 A1 | 10/2001 | Nakaho et al. |
| 2001/0026316 A1 | 10/2001 | Senatore |
| 2001/0030857 A1 | 10/2001 | Futhey et al. |
| 2001/0045981 A1 | 11/2001 | Gloger et al. |
| 2002/0036828 A1 | 3/2002 | Wong |
| 2002/0044065 A1 | 4/2002 | Quist et al. |
| 2002/0049535 A1 | 4/2002 | Rigo et al. |
| 2002/0085155 A1 | 7/2002 | Arikawa |
| 2002/0092958 A1 | 7/2002 | Lusk |
| 2002/0118321 A1 | 8/2002 | Ge |
| 2002/0133144 A1 | 9/2002 | Chan et al. |
| 2002/0149727 A1 | 10/2002 | Wang |
| 2002/0154007 A1 | 10/2002 | Yang |
| 2002/0196639 A1 | 12/2002 | Weidel |
| 2003/0002165 A1 | 1/2003 | Mathias et al. |
| 2003/0002179 A1 | 1/2003 | Roberts et al. |
| 2003/0007261 A1 | 1/2003 | Hutzel et al. |
| 2003/0016287 A1 | 1/2003 | Nakayama et al. |
| 2003/0016543 A1 | 1/2003 | Akiyama |
| 2003/0025596 A1 | 2/2003 | Lang et al. |
| 2003/0030546 A1 | 2/2003 | Tseng |
| 2003/0030724 A1 | 2/2003 | Okamoto |
| 2003/0035050 A1 | 2/2003 | Mizusawa et al. |
| 2003/0043269 A1 | 3/2003 | Park |
| 2003/0043589 A1 | 3/2003 | Blank |
| 2003/0048639 A1 | 3/2003 | Boyd et al. |
| 2003/0052969 A1 | 3/2003 | Satoh et al. |
| 2003/0058338 A1 | 3/2003 | Kawauchi et al. |
| 2003/0069690 A1 | 4/2003 | Correia et al. |
| 2003/0080877 A1 | 5/2003 | Takagi et al. |
| 2003/0088361 A1 | 5/2003 | Sekiguchi |
| 2003/0090568 A1 | 5/2003 | Pico |
| 2003/0090569 A1 | 5/2003 | Poechmueller |
| 2003/0090570 A1 | 5/2003 | Takagi et al. |
| 2003/0095331 A1 | 5/2003 | Bengoechea et al. |
| 2003/0098908 A1 | 5/2003 | Misaiji et al. |
| 2003/0101749 A1 | 6/2003 | Lingle et al. |
| 2003/0103142 A1 | 6/2003 | Hitomi et al. |
| 2003/0117522 A1 | 6/2003 | Okada |
| 2003/0122929 A1 | 7/2003 | Minuado et al. |
| 2003/0133014 A1 | 7/2003 | Mendoza |
| 2003/0137586 A1 | 7/2003 | Lewellen |
| 2003/0141965 A1 | 7/2003 | Gunderson et al. |
| 2003/0146831 A1 | 8/2003 | Berberich et al. |
| 2003/0156193 A1 | 8/2003 | Nakamura |
| 2003/0169158 A1 | 9/2003 | Paul, Jr. |
| 2003/0179293 A1 | 9/2003 | Oizumi |
| 2003/0202096 A1 | 10/2003 | Kim |
| 2003/0206256 A1 | 11/2003 | Drain et al. |
| 2003/0214576 A1 | 11/2003 | Koga |
| 2003/0214584 A1 | 11/2003 | Ross, Jr. |
| 2003/0214733 A1 | 11/2003 | Fujikawa et al. |
| 2003/0222793 A1 | 12/2003 | Tanaka et al. |
| 2003/0222983 A1 | 12/2003 | Nobori et al. |
| 2003/0227546 A1 | 12/2003 | Hilborn et al. |
| 2004/0004541 A1 | 1/2004 | Hong |
| 2004/0027695 A1 | 2/2004 | Lin |
| 2004/0032321 A1 | 2/2004 | McMahon et al. |
| 2004/0032655 A1 | 2/2004 | Kikuchi et al. |
| 2004/0032676 A1 | 2/2004 | Drummond et al. |
| 2004/0036768 A1 | 2/2004 | Green |
| 2004/0046870 A1 | 3/2004 | Leigh Travis |
| 2004/0051634 A1 | 3/2004 | Schofield et al. |
| 2004/0056955 A1 | 3/2004 | Berberich et al. |
| 2004/0057131 A1 | 3/2004 | Hutzel et al. |
| 2004/0064241 A1 | 4/2004 | Sekiguchi |
| 2004/0066285 A1 | 4/2004 | Sekiguchi |
| 2004/0075603 A1 | 4/2004 | Kodama |
| 2004/0077359 A1 | 4/2004 | Bernas et al. |
| 2004/0080404 A1 | 4/2004 | White |
| 2004/0085196 A1 | 5/2004 | Miller et al. |
| 2004/0085499 A1 | 5/2004 | Baek |
| 2004/0090314 A1 | 5/2004 | Iwamoto |
| 2004/0090317 A1 | 5/2004 | Rothkop |
| 2004/0096082 A1 | 5/2004 | Nakai et al. |
| 2004/0098196 A1 | 5/2004 | Sekiguchi |
| 2004/0105614 A1 | 6/2004 | Kobayashi et al. |
| 2004/0107030 A1 | 6/2004 | Nishira et al. |
| 2004/0109060 A1 | 6/2004 | Ishii |
| 2004/0114039 A1 | 6/2004 | Ishikura |
| 2004/0170008 A1 | 9/2004 | Tenmyo |
| 2004/0202001 A1 | 10/2004 | Roberts et al. |
| 2004/0239849 A1 | 12/2004 | Wang |
| 2004/0243303 A1 | 12/2004 | Padmanabhan |
| 2004/0264011 A1 | 12/2004 | Lynam |
| 2005/0024591 A1 | 2/2005 | Lian et al. |
| 2005/0024729 A1 | 2/2005 | Ockerse et al. |
| 2005/0078389 A1 | 4/2005 | Kulas et al. |
| 2005/0079326 A1 | 4/2005 | Varaprasad et al. |
| 2005/0099559 A1 | 5/2005 | Lee et al. |
| 2005/0099693 A1 | 5/2005 | Schofield et al. |
| 2005/0111070 A1 | 5/2005 | Lin et al. |
| 2005/0117095 A1 | 6/2005 | Ma |
| 2005/0134983 A1 | 6/2005 | Lynam |
| 2005/0140855 A1 | 6/2005 | Utsumi et al. |
| 2005/0168995 A1 | 8/2005 | Kittlemann et al. |

| | | |
|---|---|---|
| 2005/0169003 A1 | 8/2005 | Lindahl et al. |
| 2005/0172504 A1 | 8/2005 | Ohm et al. |
| 2005/0237440 A1 | 10/2005 | Sugimura et al. |
| 2005/0270766 A1 | 12/2005 | Kung et al. |
| 2006/0001641 A1 | 1/2006 | Degwekar et al. |
| 2006/0050018 A1 | 3/2006 | Hutzel et al. |
| 2006/0061008 A1 | 3/2006 | Karner et al. |
| 2006/0076860 A1 | 4/2006 | Hoss |
| 2006/0139953 A1 | 6/2006 | Chou et al. |
| 2006/0164230 A1 | 7/2006 | DeWind et al. |
| 2006/0171704 A1 | 8/2006 | Bingle et al. |
| 2006/0274218 A1 | 12/2006 | Xue |
| 2007/0041096 A1 | 2/2007 | Nieuwkerk et al. |
| 2007/0058257 A1 | 3/2007 | Lynam |
| 2007/0064108 A1 | 3/2007 | Haler |
| 2007/0080585 A1 | 4/2007 | Lyu |
| 2007/0118287 A1 | 5/2007 | Taylor et al. |
| 2007/0183037 A1 | 8/2007 | De Boer et al. |
| 2007/0183066 A1 | 8/2007 | Varaprasad et al. |
| 2007/0184284 A1 | 8/2007 | Varaprasad et al. |
| 2007/0201122 A1 | 8/2007 | Dozeman et al. |
| 2007/0262732 A1 | 11/2007 | Shen |
| 2008/0002106 A1 | 1/2008 | Van De Witte et al. |
| 2008/0030311 A1 | 2/2008 | Dayan et al. |
| 2008/0068520 A1 | 3/2008 | Minikey, Jr. et al. |
| 2008/0077882 A1 | 3/2008 | Kramer et al. |
| 2008/0094685 A1 | 4/2008 | Varaprasad et al. |
| 2008/0180529 A1 | 7/2008 | Taylor et al. |
| 2008/0180781 A1 | 7/2008 | Varaprasad et al. |
| 2008/0212189 A1 | 9/2008 | Baur et al. |
| 2008/0225538 A1 | 9/2008 | Lynam et al. |
| 2008/0231704 A1 | 9/2008 | Schofield et al. |
| 2008/0266389 A1 | 10/2008 | DeWind et al. |
| 2008/0291522 A1 | 11/2008 | Varaprasad et al. |
| 2009/0002491 A1 | 1/2009 | Haler |
| 2009/0015736 A1 | 1/2009 | Weller et al. |
| 2009/0033837 A1 | 2/2009 | Molsen et al. |
| 2009/0040465 A1 | 2/2009 | Conner et al. |
| 2009/0040588 A1 | 2/2009 | Tonar et al. |
| 2009/0040778 A1 | 2/2009 | Takayanagi et al. |
| 2009/0052003 A1 | 2/2009 | Schofield et al. |
| 2009/0067032 A1 | 3/2009 | Varaprasad et al. |
| 2009/0080055 A1 | 3/2009 | Baur et al. |
| 2009/0085729 A1 | 4/2009 | Nakamura et al. |
| 2009/0096937 A1 | 4/2009 | Bauer et al. |
| 2009/0141331 A1 | 6/2009 | Skiver et al. |
| 2009/0174776 A1 | 7/2009 | Taylor et al. |
| 2009/0184904 A1 | 7/2009 | S. et al. |
| 2009/0201137 A1 | 8/2009 | Weller et al. |
| 2009/0219394 A1 | 9/2009 | Heslin et al. |
| 2009/0231741 A1 | 9/2009 | Weller et al. |
| 2009/0237820 A1 | 9/2009 | McCabe et al. |
| 2009/0243824 A1 | 10/2009 | Hook et al. |
| 2009/0244740 A1 | 10/2009 | Takayanagi et al. |
| 2009/0262192 A1 | 10/2009 | Schofield et al. |
| 2009/0262422 A1 | 10/2009 | Cross et al. |
| 2009/0290369 A1 | 11/2009 | Schofield et al. |
| 2009/0296190 A1 | 12/2009 | Anderson et al. |
| 2010/0033797 A1 | 2/2010 | Schofield et al. |
| 2010/0045790 A1 | 2/2010 | Lynam et al. |
| 2010/0045899 A1 | 2/2010 | Ockerse |
| 2010/0046059 A1 | 2/2010 | McCabe et al. |
| 2010/0053723 A1 | 3/2010 | Varaprasad et al. |
| 2010/0085645 A1 | 4/2010 | Skiver et al. |
| 2010/0091509 A1 | 4/2010 | DeLine et al. |
| 2010/0110523 A1 | 5/2010 | Varaprasad et al. |
| 2010/0110553 A1 | 5/2010 | Anderson et al. |
| 2010/0117815 A1 | 5/2010 | Deline et al. |
| 2010/0126030 A1 | 5/2010 | Weller et al. |
| 2010/0165437 A1 | 7/2010 | Tonar et al. |
| 2010/0172008 A1 | 7/2010 | McCabe et al. |
| 2010/0174485 A1 | 7/2010 | Taylor et al. |
| 2010/0194890 A1 | 8/2010 | Weller et al. |
| 2010/0195226 A1 | 8/2010 | Heslin et al. |
| 2010/0201896 A1 | 8/2010 | Ostreko et al. |
| 2010/0202075 A1 | 8/2010 | Blank et al. |
| 2010/0207013 A1 | 8/2010 | Drummond et al. |
| 2010/0214662 A1 | 8/2010 | Takayanagi et al. |
| 2010/0219985 A1 | 9/2010 | Schofield et al. |
| 2010/0222963 A1 | 9/2010 | Schofield et al. |
| 2010/0245701 A1 | 9/2010 | Sato et al. |
| 2010/0246017 A1 | 9/2010 | Tonar et al. |
| 2010/0277786 A1 | 11/2010 | Anderson et al. |

FOREIGN PATENT DOCUMENTS

| | | |
|---|---|---|
| CN | 1189224 | 7/1998 |
| DE | 941408 | 4/1956 |
| DE | 944531 | 7/1956 |
| DE | 7323996 | 11/1973 |
| DE | 3248511 A1 | 7/1984 |
| DE | 3301945 | 7/1984 |
| DE | 3614882 | 11/1987 |
| DE | 9306989.8 U1 | 7/1993 |
| DE | 4329983 | 8/1995 |
| DE | 4444443 A1 | 6/1996 |
| DE | 29703084 U1 | 6/1997 |
| DE | 29805142 U1 | 5/1998 |
| DE | 19741896 | 4/1999 |
| DE | 19755008 | 7/1999 |
| DE | 29902344 U1 | 7/1999 |
| DE | 19934999 | 2/2001 |
| DE | 19943355 | 3/2001 |
| DE | 20118868 | 3/2002 |
| DE | 10131459 | 1/2003 |
| EP | 0299509 A2 | 1/1989 |
| EP | 0513476 A1 | 11/1992 |
| EP | 0524766 | 1/1993 |
| EP | 0729864 A1 | 12/1995 |
| EP | 0728618 A2 | 8/1996 |
| EP | 0825477 | 2/1998 |
| EP | 0830985 | 3/1998 |
| EP | 0928723 A2 | 7/1999 |
| EP | 937601 A2 | 8/1999 |
| EP | 1075986 | 2/2001 |
| EP | 1097848 A | 5/2001 |
| EP | 1152285 A2 | 11/2001 |
| EP | 1256833 | 11/2002 |
| EP | 0899157 | 10/2004 |
| EP | 1315639 | 2/2006 |
| FR | 1021987 A | 2/1953 |
| FR | 1461419 | 12/1966 |
| FR | 2585991 | 2/1987 |
| FR | 2672857 A1 | 8/1992 |
| FR | 2673499 A1 | 9/1992 |
| FR | 2759045 | 8/1998 |
| GB | 810010 | 3/1959 |
| GB | 934037 | 8/1963 |
| GB | 1008411 | 10/1965 |
| GB | 1136134 | 12/1968 |
| GB | 1553376 | 9/1979 |
| GB | 2137573 A | 10/1984 |
| GB | 2161440 | 1/1986 |
| GB | 2192370 | 1/1988 |
| GB | 2222991 | 3/1990 |
| GB | 2255539 A | 11/1992 |
| GB | 2351055 A | 12/2000 |
| GB | 2362494 | 11/2001 |
| JP | 50-000638 A | 1/1975 |
| JP | 52-146988 | 11/1977 |
| JP | 55-039843 | 3/1980 |
| JP | 57-30639 | 2/1982 |
| JP | 57-208530 | 12/1982 |
| JP | 58-030729 | 2/1983 |
| JP | 58-110334 | 6/1983 |
| JP | 58-180347 | 10/1983 |
| JP | 58-209635 | 12/1983 |
| JP | 59-114139 | 7/1984 |
| JP | 60-212730 | 10/1985 |
| JP | 60-261275 | 12/1985 |
| JP | 61-260217 | 11/1986 |
| JP | 62-043543 | 2/1987 |
| JP | 62-075619 | 4/1987 |
| JP | 62-122487 | 6/1987 |
| JP | 63-02753 | 1/1988 |
| JP | 63-106730 | 5/1988 |
| JP | 63-106731 | 5/1988 |
| JP | 63-274286 | 11/1988 |
| JP | 64-14700 | 1/1989 |

| | | |
|---|---|---|
| JP | 01-123587 | 5/1989 |
| JP | 02-122844 | 10/1990 |
| JP | 03-28947 | 3/1991 |
| JP | 03-052097 | 3/1991 |
| JP | 30-061192 | 3/1991 |
| JP | 03-110855 | 5/1991 |
| JP | 03-243914 | 10/1991 |
| JP | 04-114587 | 4/1992 |
| JP | 04-245886 | 9/1992 |
| JP | 05-213113 | 8/1993 |
| JP | 05-257142 | 10/1993 |
| JP | 60-80953 A | 3/1994 |
| JP | 61-07035 A | 4/1994 |
| JP | 62-27318 A | 8/1994 |
| JP | 06318734 | 11/1994 |
| JP | 07-175035 | 7/1995 |
| JP | 07-266928 | 10/1995 |
| JP | 07-277072 | 10/1995 |
| JP | 07-281185 | 10/1995 |
| JP | 08-008083 | 1/1996 |
| JP | 08-083581 | 3/1996 |
| JP | 08-216789 | 8/1996 |
| JP | 09-260074 | 3/1997 |
| JP | 05-077657 | 7/1997 |
| JP | 09-220976 | 8/1997 |
| JP | 09-266078 | 10/1997 |
| JP | 09-288262 | 11/1997 |
| JP | 10-076880 | 3/1998 |
| JP | 10-199480 | 7/1998 |
| JP | 10-206643 | 8/1998 |
| JP | 11-038381 | 2/1999 |
| JP | 11-067485 | 3/1999 |
| JP | 11-078693 | 3/1999 |
| JP | 11-109337 | 4/1999 |
| JP | 11-160539 | 6/1999 |
| JP | 11-212073 | 8/1999 |
| JP | 11-283759 | 10/1999 |
| JP | 11-298058 | 10/1999 |
| JP | 11-305197 | 11/1999 |
| JP | 2000-131681 | 5/2000 |
| JP | 2000-153736 | 6/2000 |
| JP | 2000-159014 | 6/2000 |
| JP | 2000-255321 | 9/2000 |
| JP | 2000-330107 | 11/2000 |
| JP | 2001-083509 | 3/2001 |
| JP | 2001-222005 | 8/2001 |
| JP | 200272901 | 3/2002 |
| JP | 2002-120649 | 4/2002 |
| JP | 2002-122860 | 4/2002 |
| JP | 2002162626 | 6/2002 |
| JP | 2002-352611 | 12/2002 |
| JP | 2003-267129 | 9/2003 |
| JP | 2004-182156 | 7/2004 |
| JP | 2005-148119 | 6/2005 |
| JP | 2005-327600 | 11/2005 |
| JP | 38-46073 | 11/2006 |
| WO | WO 82/02448 | 7/1982 |
| WO | WO 94/19212 | 9/1994 |
| WO | WO 96/21581 | 7/1996 |
| WO | WO 98/14974 | 4/1998 |
| WO | WO 98/38547 | 9/1998 |
| WO | WO 99/15360 | 4/1999 |
| WO | WO 00/23826 | 4/2000 |
| WO | WO 00/52661 | 9/2000 |
| WO | WO 00/55685 | 9/2000 |
| WO | WO 01/01192 | 1/2001 |
| WO | WO 02/18174 | 3/2002 |
| WO | WO 02/49881 | 6/2002 |
| WO | WO 03/021343 | 3/2003 |

OTHER PUBLICATIONS

Edgar, Julian; Goodbye 12 Volts . . . Hello 42 Volts!; Oct. 5, 1999; Autospeed 50; Issue 50; www.autospeed.co.nz/cms/A__0319/article. html.

Kobe, Gerry; 42 Volts Goes Underhood; Mar. 2000; Automotive Industries; Cahners Publishing Company; www.findarticles.com/p/articles/mi__m3012/is__3__180/ai__61361677.

Jewett, Dale; Aug. 2000; Automotive Industries; Cahners Publishing Company; www.findarticles.com/p/articles/mi__m3012/is__8__180ai__64341779.

National Semiconductor, LM78S40, Universal Switching Regulator Subsystem, National Semiconductor Corporation, Apr. 1996, p. 6.

Dana H. Ballard and Christopher M. Brown, Computer Vision, Prentice-Hall, Englewood Cliffs, New Jersey, 5 pages, 1982.

G. Wang, D. Renshaw, P.B. Denyer and M. Lu, CMOS Video Cameras, article, 1991, 4 pages, University of Edinburgh, UK.

N.R. Lynam, "Electrochromic Automotive Day/Night Mirror," *SAE Technical Paper Series*, 870636 (1987).

N.R. Lynam, "Smart Windows for Automobiles," *SAE Technical Paper Series*, 900419 (1990).

N.R. Lynam and A. Agrawal, "Automotive Applications of Chromogenic Materials," from *Large Area Chromogenics: Materials and Devices for Transmittance Control*, C.M. Lampert and C.G. Granquist, EDS, Optical Engineering Press, Washington (1990).

Kobe, Gerry, "Hypnotic Wizardry! (interior electronics)," *Automotive Industries*, vol. 169, No. 5, p. 60, published May 1989. Relevant section is entitled "Instrumentation."

SAE Information Report, "Vision Factors Considerations in Rear View Mirror Design—SAE J985 Oct. 1988," approved Oct. 1988, and in *1995 SAE Handbook*, vol. 3.

T. Alfey, Jr. et al., "Physical Optics of Iridescent Multilayered Plastic Films", *Polym. Eng'g & Sci.*, 9(6), 400-04 (1969).

I.F. Chang, "Electrochromic and Electrochemichromic Materials and Phenomena" in *Nonemissive Electrooptic Displays*, 155-96, A.R. Kmetz and F.K. von Willisen, eds., Plenum Press, New York (1976).

C.M. Lampert, "Electrochromic Materials and Devices for Energy Efficient Windows", *Solar Enemy Mat'ls*, 11, 1-27 (1984).

Nagai et al., "Transmissive Electrochromic Device", *Opt. Mat'ls. Tech for Energy Effic. and Solar Energy Conv. IV*, 562, 39-45, C.M. Lampert, ed., SPIE—The Int'l Soc. for Opt. Eng'g (1985).

W. Schrenk et al., "Coextruded Elastomeric Optical Interference Film", *ANTEC '88*, 1703-07 (1988).

European Search Report dated Aug. 28, 2003, in European Application No. EP 00 65 0114, Publication No. EP 1 097 848, published May 9, 2001.

U.S. Appl. No. 08/720,237, filed Sep. 26, 1996, entitle Automotive Pyroelectric Intrusion Detection, abandoned.

"Combination of rain sensing, autolamps and telephone antenna in one module," Research Disclosure, Kenneth Mason Publications, Hampshire, GB No. 412, Aug. 1998, p. 1045XP-000824825.

Product Brochure entitled "SideMinder," published in 1993 by Autosense.

* cited by examiner

_US 7,994,471 B2_

INTERIOR REARVIEW MIRROR SYSTEM WITH FORWARDLY-VIEWING CAMERA

CROSS REFERENCE TO RELATED APPLICATIONS

The present application is a continuation of U.S. patent application Ser. No. 12/467,660, filed May 18, 2009, now U.S. Pat. No. 7,888,629, which is a continuation of U.S. patent application Ser. No. 12/197,660, filed Aug. 25, 2008, now U.S. Pat. No. 7,538,316, which is a continuation of U.S. patent application Ser. No. 11/828,880, filed Jul. 26, 2007, now U.S. Pat. No. 7,420,159, which is a continuation of U.S. patent application Ser. No. 11/699,271, filed Jan. 29, 2007, now U.S. Pat. No. 7,265,342, which is a continuation of U.S. patent application Ser. No. 11/418,906, filed May 5, 2006, now U.S. Pat. No. 7,262,406, which is a continuation of U.S. patent application Ser. No. 10/913,748, filed Aug. 6, 2004, now U.S. Pat. No. 7,041,965, which is a continuation of U.S. patent application Ser. No. 10/618,334, filed Jul. 11, 2003, now U.S. Pat. No. 6,774,356, which is a continuation of U.S. patent application Ser. No. 09/997,579, filed Nov. 29, 2001, now U.S. Pat. No. 6,593,565, which is a continuation of U.S. patent application Ser. No. 09/433,467, filed Nov. 4, 1999, now U.S. Pat. No. 6,326,613, which is a continuation-in-part of U.S. patent application Ser. No. 09/003,966, filed Jan. 7, 1998, by Niall R. Lynam, now U.S. Pat. No. 6,250,148, the disclosures of which are hereby incorporated by reference herein.

BACKGROUND AND SUMMARY OF THE INVENTION

This invention relates to a vehicle interior mirror assembly.

According to the invention there is provided a vehicle interior rearview mirror assembly comprising a housing having a front end for releasable attachment to the interior surface of the vehicle windshield, a rear end having connection means for adjustably mounting a rearview mirror unit to the housing, the housing adapted for containing a rain sensor and biasing means in use biasing the rain sensor into contact with the interior surface of the windshield, the housing containing at least one further electrical component.

The invention further provides a vehicle interior rearview mirror assembly comprising a housing having a front end for releasable attachment to the interior surface of the vehicle windshield, a rear end having connection means for adjustably mounting a rearview mirror unit to the housing, the interior of the housing comprising at least one compartment, the compartment having an opening at the front end of the housing for facing in use towards the windshield and, the compartment adapted for containing a rain sensor and for biasing the rain sensor forwardly through the first opening into contact with the interior surface of the windshield, and the housing also containing at least one further electrical component.

The invention further provides a vehicle interior rearview mirror assembly comprising a housing having a front end for releasable attachment to the interior surface of the vehicle windshield, a rear end having connection means for adjustably mounting a rearview mirror unit to the housing, the interior of the housing comprising a compartment, the compartment having a first opening at the front end of the housing for facing in use towards the windshield and the compartment having a second opening on at least one side of the housing, the compartment containing a rain sensor and means for biasing the rain sensor forwardly through the first opening into contact with the interior surface of the windshield, and the compartment containing at least one further electrical component accessible through the second opening According to the present invention there is provided a vehicle interior rearview mirror assembly comprising a housing having a front end for releasable attachment to the interior surface of the vehicle windshield, a rear end having connection means for mounting a rearview mirror unit to the housing, and an internal wall subdividing the interior of the housing into first and second compartments, the first compartment having a first opening at the front end of the housing for facing in use towards the windshield and the second compartment having a second opening on at least one side of the housing, the first compartment containing a rain sensor and means for biasing the rain sensor forwardly through the first opening into contact with the interior surface of the windshield, and the second compartment containing at least one further electrical component accessible through the second opening.

The invention further provides a vehicle interior rearview mirror assembly comprising a housing having a front end for releasable attachment to the interior surface of the vehicle windshield, a rear end having connection means for releasably mounting a rearview mirror unit to the housing, a first opening at the front end of the housing for facing in use towards the windshield, and a second opening on at least one side of the housing for facing in use towards the top edge of the windshield, the housing containing a rain sensor, means for biasing the rain sensor forwardly through the first opening into contact with the interior surface of the windshield, and at least one further electrical component accessible through the second opening. The assembly further preferably including a removable cover which mates with the housing around the second opening and in use preferably extends along the windshield towards the vehicle header, and electrical leads for the rain sensor and the further electrical component which in use are routed under the cover to the header.

The invention provides the significant advantage that a vehicle manufacturer is provided with the possibility of optionally including a variety of components with the rear view mirror assembly. This possibility is made available for example during the assembly line process where the desired components to meet a particular specification can be included in the rear view mirror assembly. Furthermore, the removable cover readily provides for the functional advantage of readily incorporating a selected component whilst at the same time providing a functionally attractive cover. The automaker is therefore provided with the considerable advantage of the possibility of providing a plurality of diverse options quickly and speedily during the assembly line process.

An embodiment of the invention will now be described, by way of example, with reference to the accompanying drawings, in which:

In certain of the figures some components are omitted or shown in dashed outline to reveal the underlying structure.

DESCRIPTION OF THE PREFERRED EMBODIMENTS

Figure 2:
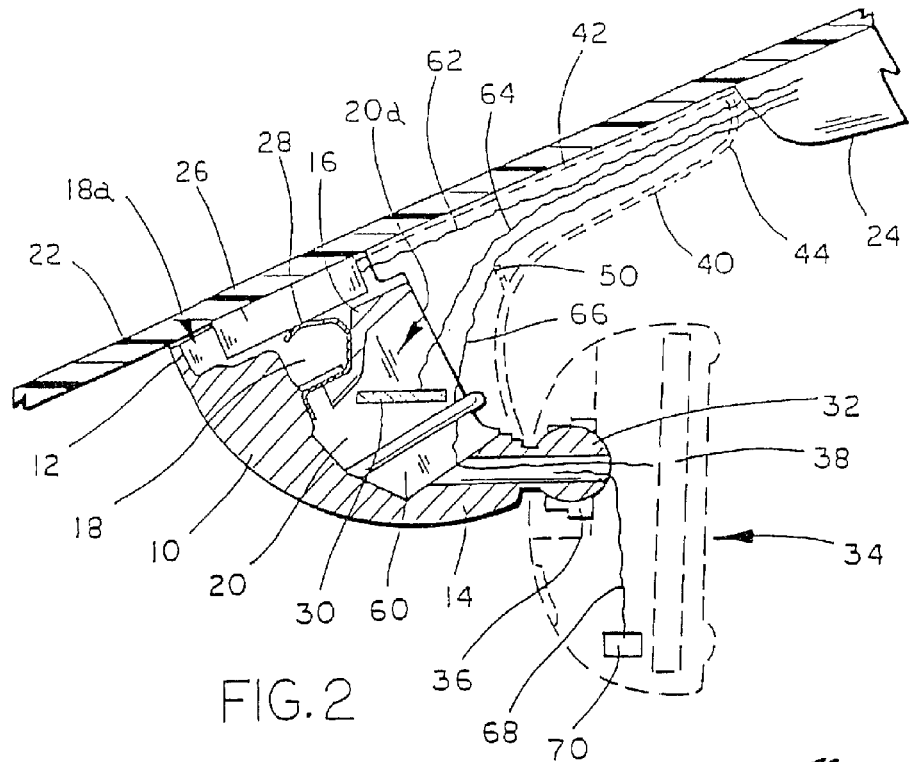
FIG. 2 is a cross-section through the mirror assembly of FIG. 1.
Figure 1:
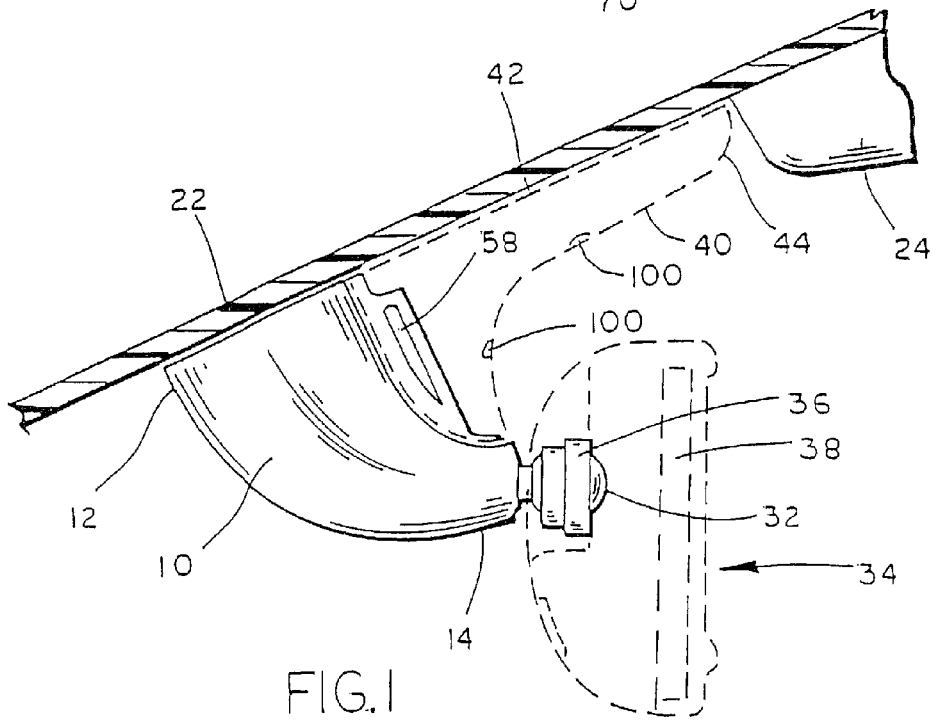
FIG. 1 is a side view of an embodiment of a vehicle interior mirror assembly according to the invention attached to the interior surface of a windshield.
Figure 3:
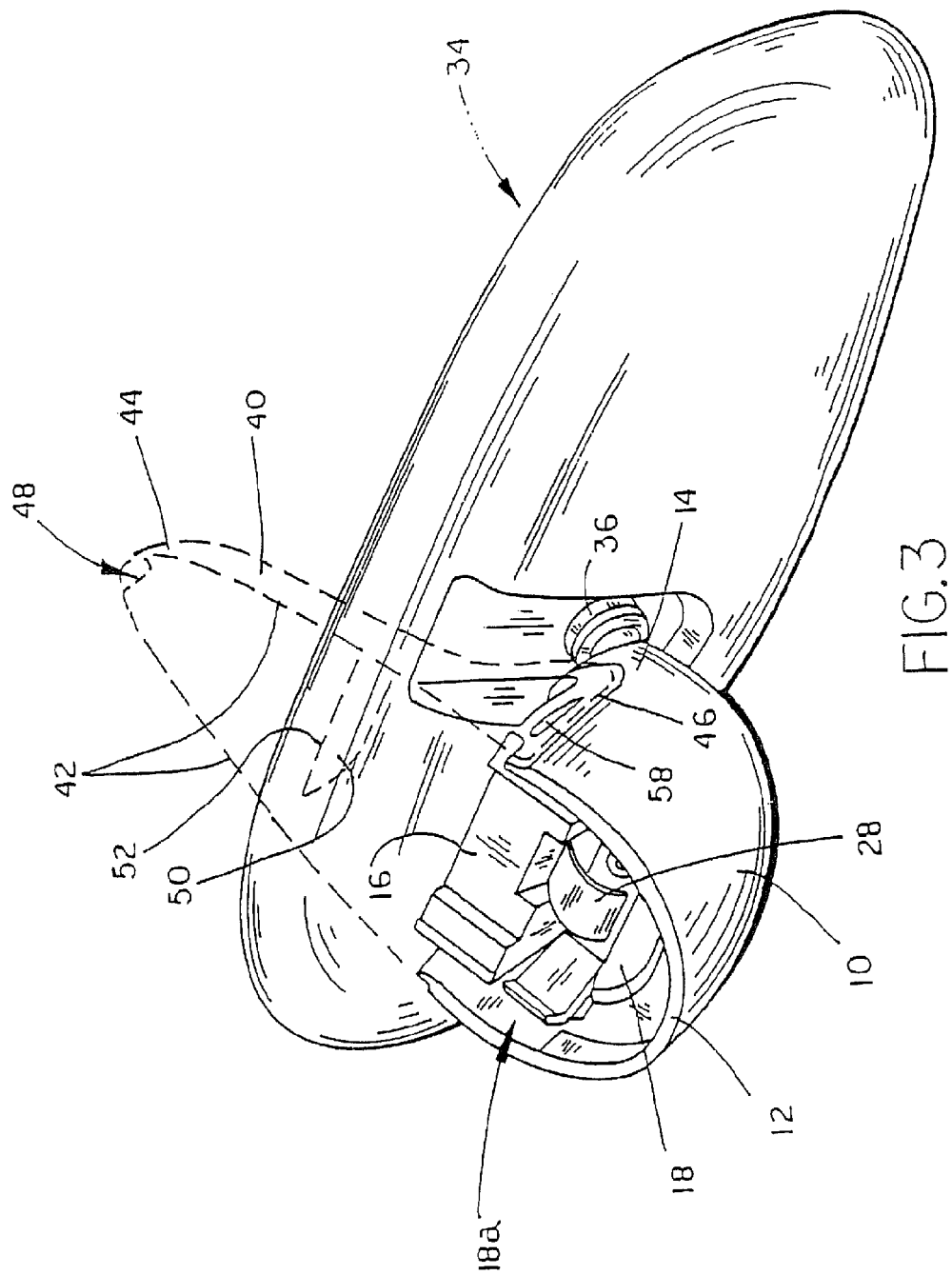
FIG. 3 is a perspective top view of the mirror assembly.
Figure 4:
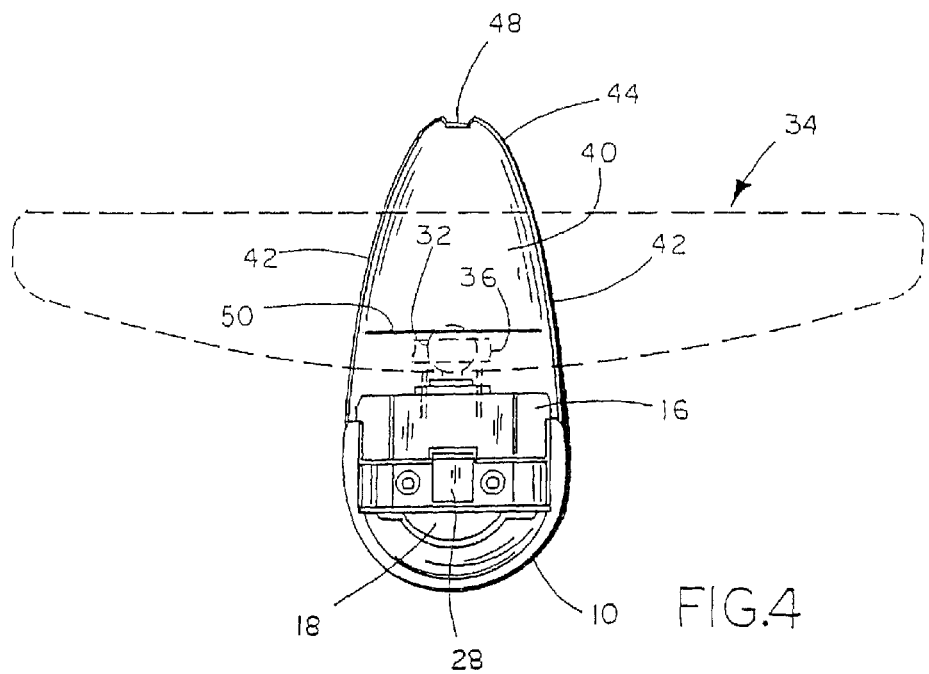
FIG. 4 is a view of the mirror assembly of FIG. 3 looking into the opening 18.

Referring to the drawings, a vehicle interior rearview mirror assembly comprises a die cast metal housing 10 (or optionally may be formed from a plastic moulding such as engineering polymeric resin such as a filled nylon or the like) having a front end 12 and a rear end 14, the front end 12 being releasably attached to the interior surface of the vehicle windshield 22 in a manner to be described. The interior of the housing 10 is subdivided by an internal wall 16 into first and second compartments 18, 20 respectively, the first compartment 18 having an opening 18a at the front end of the housing 10 which in use, and as shown in FIGS. 1 and 2, faces towards the windshield 22 and the second compartment having an opening 20a on the side of the housing which in use faces towards the vehicle header 24 at the top edge of the windshield. The front end 12 of the housing 10 is releasably attached to the windshield 22 using an annular mounting button, not shown, in the manner described in EP 0 928 723 and U.S. patent application Ser. No. 09/003,966, entitled "Rain Sensor Mount for Use in a Vehicle" to Niall R Lynam, now U.S. Pat. No. 6,250,148, the disclosures of which are incorporated herein by reference. As shown in the various figures of the Ser. No. 09/003,966 application, it is desirable that the rain sensor mounting member attached to the windshield and the rearview mirror mounting button provided on the rain sensor module are generally aligned along a common axis when the rain sensor module is mounted to the vehicle in order to provide a mounting of a rearview mirror assembly to the rain sensor module that is generally coaxial with the mounting of the rain sensor module to the windshield. Optionally, a ceramic black fit layer, as is commonly known in the windshield fabrication art, can be used on the inner surface of the windshield to hide the attachment location of the rain sensor module. However, the center portion of such a ceramic layer should include a central opening or at least provide efficient transmission for the output of the light emitters and the rain sensor unit at the point of contact of its detecting surface to the windshield or to an adhesive layer. The rain sensor module assembly includes the rain sensor unit, which is positioned in the housing and projects through an opening or port provided on a windshield facing side of the housing and extends through an inner hollow open central portion of the rain sensor mounting button to contact the inner surface of the windshield. The rain sensor unit preferably comprises a compact rain sensor unit available from ITT Automotive Europe, GMBH of Frankfurt, Germany. The rain sensor unit includes a detecting surface which projects through an opening provided in adhesive layer so that direct contact is achieved between the inner surface of the windshield and the detecting surface of the rain sensor unit, and also includes a light emitting source and a light detecting source along with associated electronic circuitry for generating an electrical signal indicative of detection of moisture on the outer surface of the windshield. Light emitted by the emitter passes through the rain sensor detecting surface and is refracted at the outer windshield surface, and re-enters the rain sensor at its detecting surface to impinge the light detector of the rain sensor, whose output is processed by electronic circuitry to detect the presence/absence of moisture on the windshield. The circuitry (in whole or in part) can be contained in the rain sensor and/or within the housing of the module. Optionally, the electronic circuitry can be located/share components with/receive input from or deliver output electrical accessories in the vehicle, such as a CAN bus, electronically equipped mirrors such as lighted mirror and automatic dimming electrochromic mirrors, overhead consoles, and similar electrically functioning vehicle components. Electrical connectors can be accommodated at the rain sensor module, such as at or on its housing. The rain sensor can be separately removable from the module for service, or can be an integral part of the module so that a unitary module is provided by a supplier to the automaker for mating with a windshield mounting member as the vehicle passes along the vehicle assembly line (or at a local ready-to-install windshield supply plant), and thereafter for attachment thereto of a rearview mirror assembly. The electrical signal output by the rain sensor can be used to automatically operate the wiper system for the windshield and/or the backlite, or operate other vehicular functions such as close a sunroof in the event of rain or change the braking and/or traction characteristics of the vehicle braking and/or traction control systems.

The compartment 18 contains a rain sensor 26, preferably a compact rain sensor module available from ITT Automotive Europe GmbH of Frankfurt, Germany. The compartment 18 preferably also contains an arcuate steel spring finger 28 which is secured to the base of the compartment 18 behind the rain sensor 26 and preferably serves to bias the rain sensor 26 through the aperture in the mounting button and the opening 18a into optical contact with the windshield 22. Most preferably, rain sensor 26 is a module which has a cross section diameter of at least 25 millimeters (mm), more preferably at least 30 mm, but with a maximum diameter $\leq$50 mm, more preferably $\leq$40 mm, and most preferably $\leq$35 mm.

The compartment 20 contains at least one further electrical component which is accessible through the opening 20a. In the present embodiment the component is a printed circuit board 30 bearing a compass sensor such as a flux gate, magnetoinductive, magnetoresistive or magnetocapacitive sensor.

At its rear end 14 the housing 10 has an integral ball 32 for releasably and adjustably mounting a rearview mirror unit 34 to the housing 10 generally in conventional manner. The mirror unit 34 comprises a mirror housing 36 containing a mirror 38 which is preferably an electro-optic mirror comprising front and rear plates separated by a space which contains an electro-optic medium such as an electrochromic medium allowing variation in the amount of light transmitted through the medium by varying the strength of an electric field applied across the medium. Alternatively a prismatic mirror element can be used. Such mirrors are well known in the art. The ball 32 constitutes one part of a ball and socket joint, the socket 36 being carried by the mirror housing 36. The mirror housing is adjustable about the ball and socket joint. Advantageously, the housing 10 is fixedly attached to the windshield when mounted thereto. Thus, adjustment of the mirror housing to set the field of rearward view of the mirror reflective element therein does not effect the position/orientation of rain sensor and any other accessory housed in fixedly-attached housing 10. This is particularly advantageous when the electrical accessory in housing 10 comprises a compass sensor such as a magneto-resistive sensor, a magneto-inductive sensor, a magneto-capacitive sensor or a flux-gate sensor. By having the housing 10 be fixedly attached, and by having it accommodate at least two electrical accessories (at least one of which preferably comprises a rain sensor that is mounted in the housing 10 so as to view through and preferably contact the windshield inner surface, and with the rain sensor attached to the windshield generally coaxial with the mirror unit that is adjustable about housing 10), a compact overall interior mirror system is provided comprising a housing accommodating a plurality of electrical accessories, the housing fixedly and detachably mounted to a receiving structure on the inner surface (typically a glass surface) of the vehicle windshield and with a mirror unit comprising a mirror support arm and a mirror housing including a reflector element, the mirror support arm/mirror housing being adjustable about the fixed housing (and optionally detachable therefrom). In this manner, the housing 10 presents a minimal footprint when viewed from outside the vehicle through the vehicle windshield.

Figure 7:
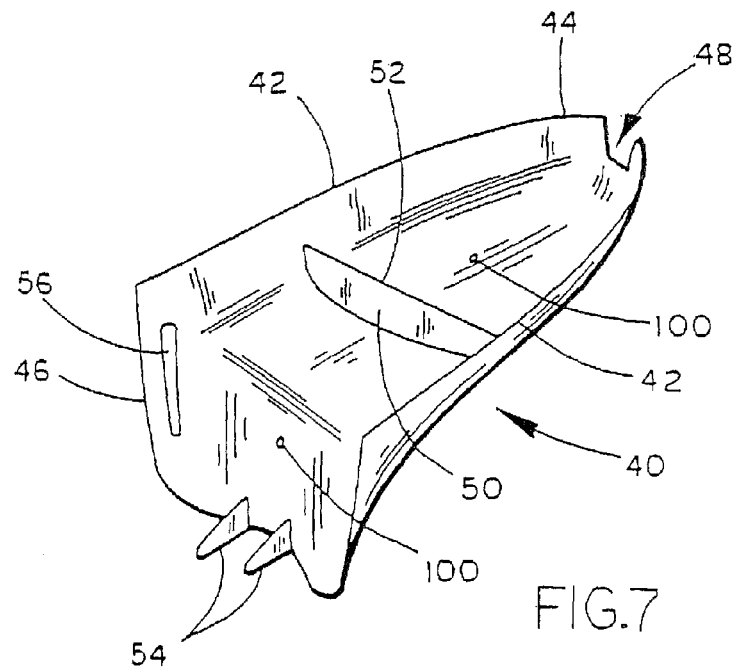
FIG. 7 is a perspective view of the wiring cover forming part of the mirror assembly.

The assembly further includes a removable cover 40 which mates with the housing 10 around the opening 20a and extends along the windshield to the vehicle header 24. The cover 40, which is longitudinally symmetric, is moulded from a resilient, polymeric or plastics material and comprises a pair of opposite, substantially coplanar, longitudinal side edges 42, FIG. 7, which diverge from a relatively narrow rear end 44 of the cover 40 to a relative wide flared front end 46. The flared front end 46 of the cover is open, and there is also a small opening 48 at the narrow rear end 44. The cover 40 has an internal strengthening wall 50 whose free edge 52 is recessed below the level of the edges 42. At its flared front end the cover 40 has a pair of forward projections 54, and the inside surface of the cover has a pair of raised ridges 56 (only one is seen in FIG. 7) each extending along a respective side of the cover adjacent to the front end 46.

The exterior surface of the housing 10 has a corresponding pair of elongated grooves or depressions 58 along each side of the opening 20a, the exterior width of the housing across the opening 20a being substantially the same as the interior width of the cover 40 across the grooves 58.

Figure 5:
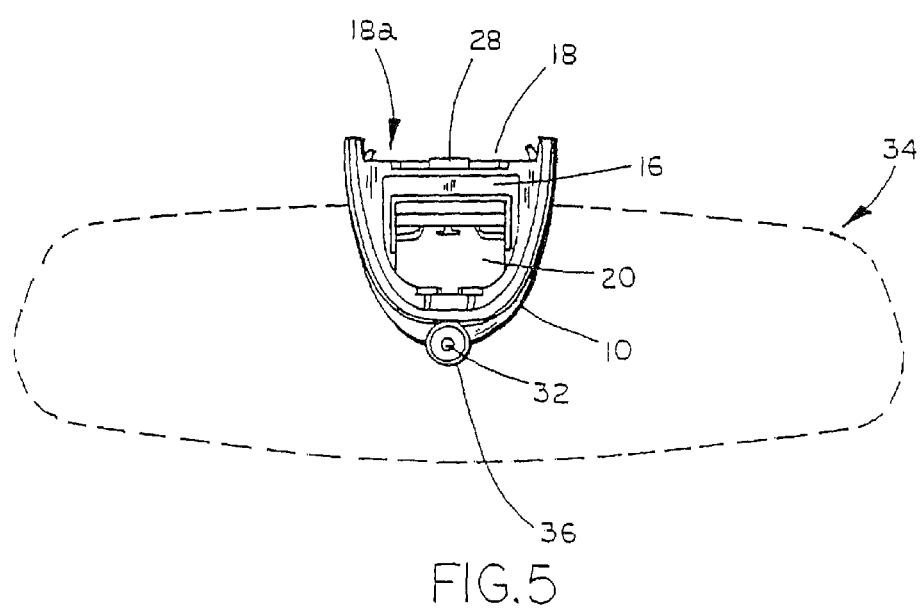
FIG. 5 is a view of the mirror assembly of FIG. 3 looking into the opening 20.
Figure 6:
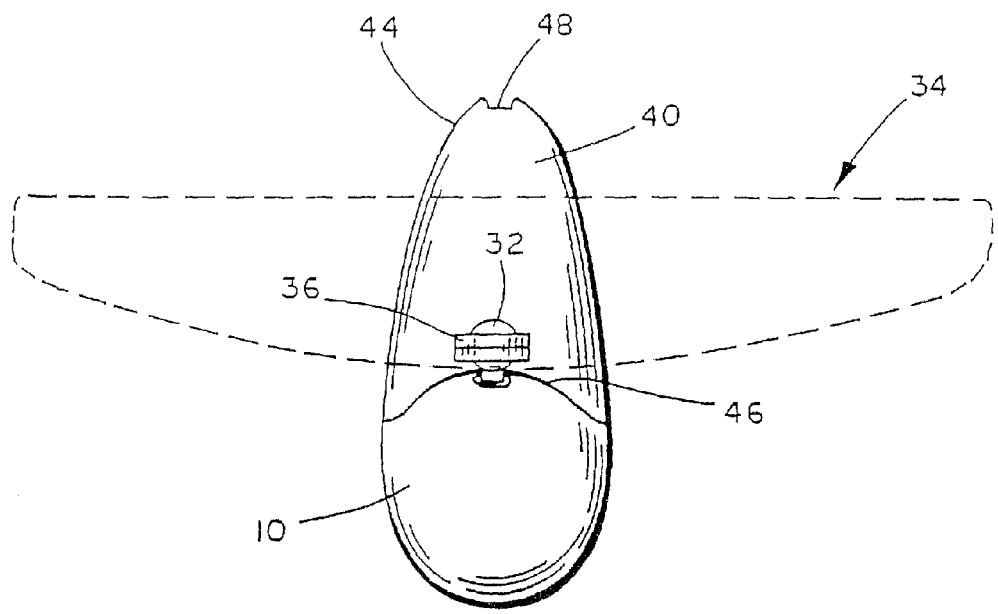
FIG. 6 is a view of the mirror assembly of FIG. 3 looking from underneath.

The cover 40 is fitted to the housing 10 by first inserting the projections 54 into a recess 60, FIGS. 2 and 5, above the opening 20a and then rotating the cover towards the windshield until the ribs 56 snap-engage the grooves 58 (the cover 40 is sufficiently resilient to permit this) and the edges 42 of the cover come to lie flat against the interior surface of the windshield 22, as seen in FIGS. 1 and 2. The cover 40 may be removed by pulling the narrow end 44 away from the windshield until the ribs 56 disengage the grooves 58 and then withdrawing the projection 54 from the recess 60.

The cover 40 serves a dual purpose. First, it protects the compartment 20a and hence the component 30 against the ingress of dust and other contaminants, yet it is easily removed to allow the component 30 to be serviced or replaced, if necessary after removing the mirror unit 34. Secondly, it provides a conduit for electrical leads 62, 64 and 66 respectively from the rain sensor 26, component 30 and (if fitted) the electro-optic or other electrically operated mirror 38.

As seen in FIG. 1, these leads are routed under the cover 40 and through the opening 48 at the rear end 44 of the cover into the vehicle header 24 where they are connected into the vehicle electrical system.

As clearly shown in FIG. 2, the ball joint 32 includes a passageway or a conduit through which can pass the electrical leads connecting to a component such as a electrochromic mirror element 38 or compass display in the mirror head 34. In particular, there is shown a lead 68 connected to a compass display 70 which displays through the mirror element. Alternatively, the display 70 can be located at other positions in the interior rear view mirror assembly, such as in a chin portion or in an eyebrow portion.

Optionally, the removable cover includes at least one opening 100 or port through which a pointed object such as, the tip of a ball point pen or a needle or the like can be inserted to activate switches on a PCB located in one of the compartments. Thus, for example, the zone and/or the calibration of a compass PCB can be adjusted without the necessity to remove the removable cover.

Figure 8:
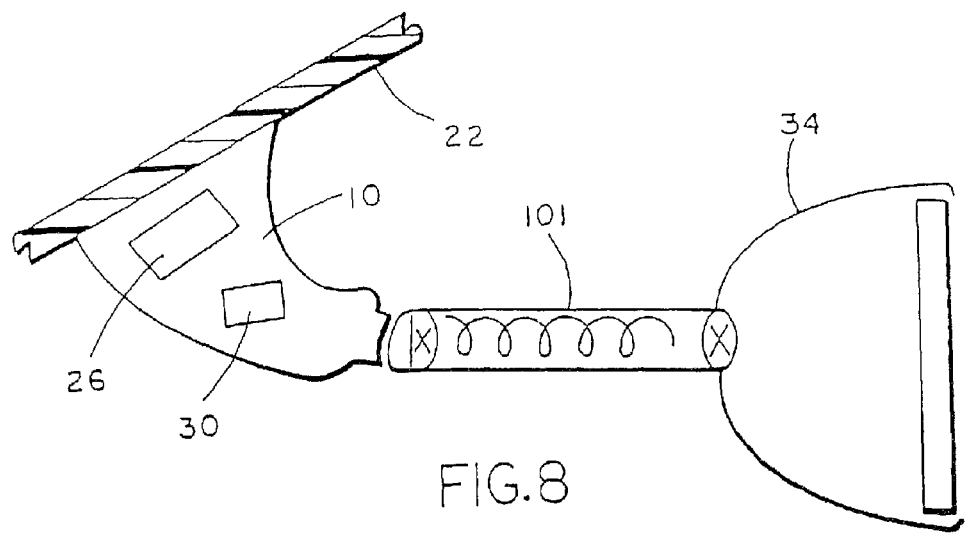
FIG. 8 is a schematic view of another embodiment of vehicle interior mirror assembly according to the invention.
Figure 9:
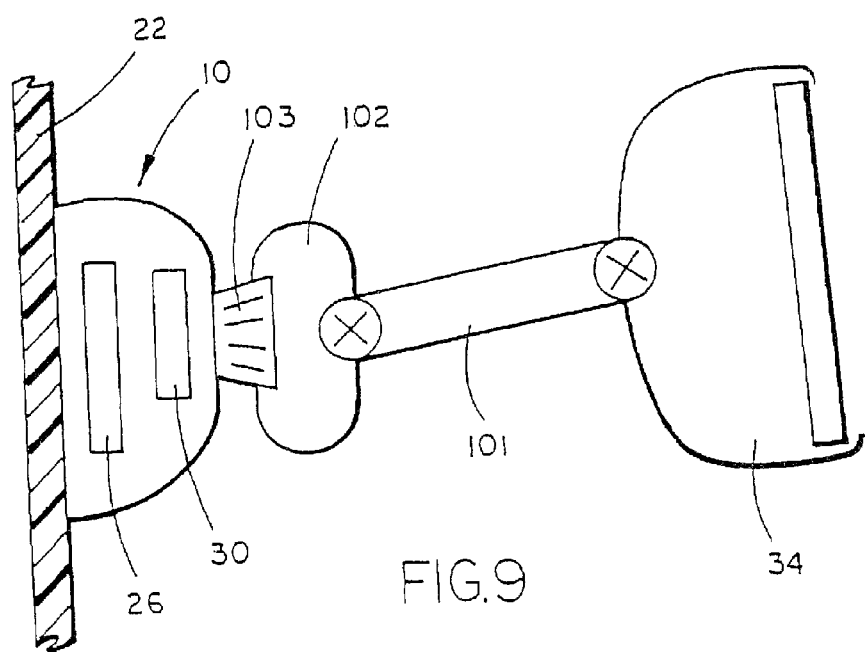
FIG. 9 is a schematic view of yet a further embodiment of a vehicle into rear mirror assembly according to the invention.

Also, a camera may be located on the assembly for example on the housing, or mirror unit or cover and arranged to look either forwardly or rearwardly in terms of the direction of motion of the vehicle, or in another desired direction. In FIGS. 8 and 9 there is shown schematic views of other embodiments of the invention. Thus, in FIG. 8 there is shown the housing 10 containing a rain sensor 26 and another electrical component for example a printed circuit board of a compass sensor 30, with the housing attached to the vehicle windshield 22. The mirror unit 34 is adjustably attached to the housing 10 by a double ball adjustable mirror support arm 101.

In FIG. 9, the mirror support arm 101 is attached to a mirror assembly mount 102. The housing 10 also comprises a mirror assembly mount button 103 which may be fixed to the housing 10 or integrally formed therewith. The mount 102 is detachably attached to the mirror assembly mount button 103.

Although the component 30 has been described as a compass sensor PCB, it can be any of a number of sensors or circuits which can be made small enough to fit in the compartment 20. Preferably, component 30 is provided as a unitary module that is received within compartment 20. Most preferably, component 30 is electrically connected with the electric/electronic wiring provided to the rear view mirror assembly. Thus, an electronic accessory can be provided as a module, can be inserted and received in the rear view mirror assembly, and can make electrical connection (such as by a plug and socket to the rear view mirror assembly). This facilitates and enables the manufacture and supply of the rear view mirror assembly, by a mirror assembly manufacturer, to a vehicle assembly line, and the separate manufacture and supply of the electrical/electronic module to that vehicle assembly line, with the automaker conveniently inserting the electric/electronic module into the compartment of the rear view mirror assembly when the rear view mirror assembly is being mounted on a vehicle passing down a vehicle assembly line.

For example, the compartment 20 may contain a sensor or sensors for vehicle altitude and/or incline, seat occupancy or air bag activation enable/disable, or (if a viewing aperture is made in the housing 10) photosensors for headlamp intensity/daylight intensity measurement. Alternatively, the compartment 20 may contain a transmitter and/or receiver, along with any associated sensors, for geographic positioning satellite (GPS) systems, pagers, cellular phone systems, ONSTAR™ wireless communication, systems, vehicle speed governors, security systems, tire monitoring systems, remote fueling systems where vehicle fueling and/or payment/charging for fuel is remotely achieved, remote keyless entry systems, garage and/or security door opener systems, INTERNET interfaces, vehicle tracking systems, remote car door unlock systems, e-mail systems, toll booth interactions systems, highway information systems, traffic warning systems, home access systems, garage door openers and the like. Of course, any of the above may be mounted under the cover 40, in addition to the component 30 in the compartment 20.

Where the component 30 is a transmitter or receiver, or where a further component mounted under the cover 40 is a transmitter or receiver, the cover 40 may include an associated antenna. The antenna may mounted as a separate item under the cover 40, or the cover itself may serve as the antenna, being either coated with a layer of conductive material or moulded from a conductive plastics material.

Also, a photosensor may be included in a compartment of the housing, preferably a skyward facing photosensor that views skyward through the vehicle windshield for the purpose of providing automatic headlamp activation/deactivation at dusk/dawn. Also, the housing may include a single microphone or a plurality of microphones for detecting vocal inputs from vehicle occupants for the purpose of cellular phone wireless communication.

Most preferably such microphones provide input to an audio system that transmits and communicates wirelessly with a remote transceiver, preferably in voice recognition mode. Such systems are described in commonly assigned, U.S. patent application Ser. No. 09/382,720, filed Aug. 25, 1999, now U.S. Pat. No. 6,243,003, the disclosure of which is hereby incorporated by reference herein.

In this regard it may be desirable to use audio processing techniques such as digital sound processing to ensure that vocal inputs to the vehicular audio system are clearly distinguished from cabin ambient noise such as from wind noise, HVAC, and the like.

Preferably the housing includes an analog to digital converter and or a digital analog converter for the purpose of converting the analog output of the microphone to a digital signal for input to a digital sound processor and for conversion of the digital output of a digital sound processor to an analog signal for wireless transmission to a remote transceiver.

The housing may include a variety of information displays such as a PSIR (Passenger Side Inflatable Restraint) display, an SIR (Side-Airbag Inflatable Restraint), compass/temperature display, a tire pressure status display or other desirable displays, such as those described in commonly assigned, U.S. patent application Ser. No. 09/244,726, filed Feb. 5, 1999, now U.S. Pat. No. 6,172,613, the disclosure of which is hereby incorporated by reference herein.

For example, the interior rearview mirror assembly may include a display of the speed limit applicable to the location where the vehicle is travelling. Conventionally, speed limits are posted as a fixed limit (for example, 45 MPH) that is read by the vehicle driver upon passing a sign. As an improvement to this, an information display (preferably an alphanumerical display and more preferably, a reconfigurable display) can be provided within the vehicle cabin, readable by the driver, that displays the speed limit at whatever location on the road/highway the vehicle actually is at any moment. For example, existing speed limit signs could be enhanced to include a transmitter that broadcasts a local speed limit signal, such signal being received by an in-vehicle receiver and displayed to the driver. The speed limit signal can be transmitted by a variety of wireless transmission methods, such as radio transmission, and such systems can benefit from wireless transmission protocols and standards, such as the BLUETOOTH low-cost, low-power radio based cable replacement or wireless link based on short-range radio-based technology. Preferably, the in-vehicle receiver is located at and/or the display of local speed limit is displayed at the interior mirror assembly (for example, a speed limit display can be located in a chin or eyebrow portion of the mirror case, such as in the mirror reflector itself, such as in the cover 40, or such as in a pod attached to the interior mirror assembly). More preferably, the actual speed of the vehicle can be displayed simultaneously with and beside the local speed limit in-vehicle display and/or the difference or excess thereto can be displayed. Optionally, the wireless-based speed limit transmission system can actually control the speed at which a subject vehicle travels in a certain location (such as by controlling an engine governor or the like). Thus, a school zone speed limit can be enforced by transmission of a speed-limiting signal into the vehicle. Likewise, different speed limits for the same stretch of highway can be set for different classes of vehicles. The system may also require driver identification and then set individual speed limits for individual drivers reflecting their skill level, age, driving record and the like. Moreover, a global positioning system (GPS) can be used to locate a specific vehicle, calculate its velocity on the highway, verify what the allowed speed limit is at that specific moment on that specific stretch of highway, transmit that specific speed limit to the vehicle for display (preferably at the interior rearview mirror that the driver constantly looks at as part of the driving task) and optionally alert the driver or retard the driver's ability to exceed the speed limit as deemed appropriate. A short-range, local communication system such as envisaged in the BLUETOOTH protocol finds broad utility in vehicular applications, and particularly where information is to be displayed at the interior mirror assembly, or where a microphone or user-interface (such as buttons to connect/interact with a remote wireless receiver) is to be located at the interior (or exterior) rearview mirror assembly. For example, a train approaching a railway crossing may transmit a wireless signal such as a radio signal (using the BLUETOOTH protocol or another protocol) and that signal may be received by and/or displayed at the interior rearview mirror assembly (or the exterior sideview mirror assembly). Also, the interior rearview mirror and/or the exterior side view mirrors can function as transceivers/display locations/interface locations for intelligent vehicle highway systems, using protocols such as the BLUETOOTH protocol. Protocols such as BLUETOOTH, as known in the telecommunications art, can facilitate voice/data, voice over data, digital and analogue communication and vehicle/external wireless connectivity, preferably using the interior and/or exterior mirror assemblies as transceiver/display/user-interaction sites. Electronic accessories to achieve the above can be accommodated in housing 10, and/or elsewhere in the interior mirror assembly (such as in the mirror housing). Examples of such electronic accessories include in-vehicle computers, personal organizers/palm computers such as the Palm Pilot™ personal display accessory (PDA), cellular phones and pagers, remote transaction interfaces/systems such as described in commonly assigned, U.S. patent application Ser. No. 09/057,428, filed Apr. 8, 1998, now U.S. Pat. No. 6,158,655, the disclosure of which is hereby incorporated by reference herein, automatic toll booth payment systems, GPS systems, e-mail receivers/displays, a videophone, vehicle security systems, digital radio station transmission to the vehicle by wireless communication as an alternate to having an in-vehicle dedicated conventional radio receiver, traffic/weather broadcast to the vehicle, preferably digitally, and audio play and/or video display thereof in the vehicle, most preferably at the interior rearview mirror, highway hazard warning systems and the like.

The information display at the interior rearview mirror assembly (such as at the mirror housing or viewable in the mirror reflector) may be formed using electronic ink technology and can be reconfigurable. Examples of electronic ink technology include small plastic capsules or microcapsules, typically $\frac{1}{10}$ of a millimeter across or thereabouts, that are filled with a dark ink and that have in that ink white particles which carry a charge such as a positive charge. Electrodes place an electric field across the capsules and the electric field can attract or repel the charged particles in the capsules. If the white particle is attracted to the top of a capsule so that it is closest to a viewer, the display element/pixel appears white to the viewer. If the white particle is attracted to the bottom of the capsule (away from the viewer), the display element/pixel appears dark as the viewer now sees the dark ink in the capsule. Such displays are available from E Ink of Cambridge, Mass. Such electronic ink displays have the advantage of forming text or graphics that, once formed, do not disappear when the display powering voltage is disconnected (i.e. they have a long display memory). Alternately, GYRICON™ electronic ink technology developed by XEROX Corporation can be used. Here, microbeads are used that are black (or another dark color) on one side and white (or another light color) on the other side. The beads are dipolar in that one hemisphere carries a stronger (and hence different) charge than the opposing other hemisphere. The beads are small (about 1/10th of a millimeter diameter) and turn or flip when placed in an electric field, with the respective poles of the dipolar beads being attracted to the corresponding polarity of the applied electric field. Thus, a white pixel or a black pixel can be electrically written. Once the bead has turned or flipped, it remains turned or flipped unless an electric potential of the opposite polarity is applied. Thus, the display has memory.

Other types of information displays can be used at the interior mirror location. For example, a field-emission display such as the field-emission display available from Candescent Technologies of San Jose, Calif. can be used. Field-emission displays include a plurality of charge emitting sources or guns that bombard a phosphor screen. For example, a myriad of small or microscopic cones (<1 micron tall, for example and made of a metal such as molybdenum) are placed about a millimeter from phosphors on a screen. The cones emit electrons from their tips or apexes to bombard the phosphors under an applied electric field. This technology is adaptable to provide thin display screens (such as less than 10 mm or so). Alternately, field-emission displays can be made using carbon nanotubes which are cylindrical versions of buckminsterfullerene, and available from Motorola. Such field-emission displays are particularly useful for video displays as they have high brightness and good contrast ratio, even under high ambient lighting conditions such as in a vehicle cabin by clay. Such displays can be located at the interior rearview mirror, preferably, or optionally elsewhere in the vehicle cabin such as in the dash, in the windshield header at the top interior edge of the windshield, in a seat back, or the like.

A further advantage of providing a housing 10 which accommodates multiple electrical accessories, preferably in individual compartments, is that incorporation of optional accessories into a specific vehicle is facilitated. It also facilitates supply of the housing 10 and associated mirror unit by a mirror manufacturer and supply of at least one of the electrical accessories by a second, different accessory manufacturer, and with the automaker placing the at least one electrical accessory into the housing 10 at the vehicle assembly plant, preferably at the vehicle assembly line. Thus, for example, an interior mirror assembly can be manufactured by a mirror supplier that includes housing 10, compartments 18 and 20 (or, optionally, more compartments), printed circuit board 30 (such as a compass sensor printed circuit board) in compartment 20 but with compartment 18 empty, removable cover 40, a mirror support aim articulating about housing 20, a mirror housing or case supported on said support arm, a reflector element in said mirror housing (preferably an electrochromic mirror element which includes an information display such as of compass direction and/or temperature displaying through said mirror element as is known in the mirror arts). A rain sensor module can be made by a separate manufacturer. The rain sensor module and the interior mirror assembly can be shipped to a vehicle assembly plant (or local to it). Then, when a particular vehicle requires a rains sensor module, the vehicle manufacturer can place the rain sensor module into compartment 18, connect the rain sensor module to the wire harness provided to mirror assembly (preferably, the rain sensor module docks into compartment 18 in a manner that connects it electrically to the vehicle or alternatively, the rain sensor module includes a plug or socket that connects to a corresponding socket or plug already provided in housing 10 (or elsewhere on the interior mirror assembly). This allows "plug & play" accommodation of multiple accessories into the interior rearview mirror assembly. Also, the interior rearview mirror assembly may be shipped to the assembly plant with both compartments 18 and 20 empty, thus allowing, for example, the automaker to solely place a rain sensor module into compartment 18 but add no further accessory into compartment 20.

The invention is not limited to the embodiments described herein which may be modified or varied without departing from the scope of the invention.

The invention claimed is:
1. An interior rearview mirror system for a vehicle, said interior rearview mirror system comprising:
- an attachment element attached at an in-cabin surface of a vehicle windshield of the vehicle equipped with said interior rearview mirror system;
- an interior rearview mirror assembly configured for attachment to said attachment element;
- wherein said interior rearview mirror assembly comprises a structure that includes (i) a mount for attaching said interior rearview mirror assembly to said attachment element and (ii) a pivot element;
- wherein said interior rearview mirror assembly comprises an interior rearview mirror head pivotally attached at said pivot element;
- wherein said interior rearview mirror head includes an electrochromic rearview mirror element;
- wherein, with said interior rearview mirror assembly attached to said attachment element, said interior rearview mirror head is adjustable by a driver of the equipped vehicle about said pivot element to adjust a rearward field of view of said electrochromic rearview mirror element;
- wherein, with said interior rearview mirror assembly attached to said attachment element, at least two accessories are encompassed by said structure of said interior rearview mirror assembly;
- wherein said structure comprises at least one of (i) a polymeric structure formed by molding and (ii) a metallic structure formed by metallic fabrication;
- wherein, with said interior rearview mirror assembly attached to said attachment element, said structure covers said at least two accessories from view by the driver operating the equipped vehicle;
- wherein, with said interior rearview mirror assembly attached to said attachment element, said structure includes at least one of (a) a portion abutting close to the in-cabin surface of the vehicle windshield and at least partially encompassing where said at least two accessories are disposed, and (b) a portion contacting the in- cabin surface of the vehicle windshield and at least partially encompassing where said at least two accessories are disposed; and wherein one of said at least two accessories comprises a forwardly-viewing camera and wherein, with said interior rearview mirror assembly attached to said attachment element, said forwardly-viewing camera views through the vehicle windshield.

2. The interior rearview mirror system of claim 1, wherein said structure comprises a detachable cover.

3. The interior rearview mirror system of claim 2, wherein said structure comprises a metallic structure formed by metallic fabrication and wherein said detachable cover comprises a polymeric molding, and wherein said detachable cover detachably attaches to said metallic structure.

4. The interior rearview mirror system of claim 3, wherein, with said detachable cover attached at said metallic structure and with said interior rearview mirror assembly attached to said attachment element, a rain sensor is covered by said detachable cover from view by the driver operating the equipped vehicle.

5. The interior rearview mirror system of claim 3, wherein, with said detachable cover attached at said metallic structure and with said interior rearview mirror assembly attached to said attachment element, said detachable cover abuts the in-cabin surface of the vehicle windshield.

6. The interior rearview mirror system of claim 5, wherein said detachable cover contacts the in-cabin surface of the vehicle windshield.

7. The interior rearview mirror system of claim 3, wherein, with said detachable cover attached at said metallic structure and with said interior rearview mirror assembly attached to said attachment element, an edge portion of said detachable cover lies flat against the in-cabin surface of the vehicle windshield.

8. The interior rearview mirror system of claim 2, wherein, with said interior rearview mirror assembly attached to said attachment element, said detachable cover is detachable to facilitate service of at least one of said at least two accessories.

9. The interior rearview mirror system of claim 2, wherein said at least two accessories form a cluster of individual sensors and wherein, with said interior rearview mirror assembly attached to said attachment element, said cluster of individual sensors resides on or near the in-cabin surface of the vehicle windshield.

10. The interior rearview mirror system of claim 9, wherein said detachable cover covers said cluster from view by the driver operating the equipped vehicle.

11. The interior rearview mirror system of claim 2, wherein said detachable cover comprises a functionally attractive cover.

12. The interior rearview mirror system of claim 1, wherein a portion of said structure comprises a polymeric structure formed by molding and another portion of said structure comprises a metallic structure formed by metallic fabrication.

13. The interior rearview mirror system of claim 12, wherein said metallic structure comprises a die cast metallic structure.

14. The interior rearview mirror system of claim 12, wherein said forwardly-viewing camera is accommodated by said metallic structure.

15. The interior rearview mirror system of claim 14, wherein a compartment of said metallic structure accommodates said forwardly-viewing camera.

16. The interior rearview mirror system of claim 15, wherein said polymeric structure detachably attaches to said metallic structure.

17. The interior rearview mirror system of claim 1, wherein said pivot element comprises an element of a ball and socket pivot joint.

18. The interior rearview mirror system of claim 17, wherein said pivot joint includes a passageway.

19. The interior rearview mirror system of claim 18, wherein at least one electrical lead passes through said passageway of said pivot joint.

20. The interior rearview mirror system of claim 19, wherein said at least one electrical lead connects to circuitry disposed in said interior rearview mirror head.

21. The interior rearview mirror system of claim 20, wherein said circuitry relates to said electrochromic rearview mirror element.

22. The interior rearview mirror system of claim 20, wherein said circuitry relates to a display in said interior rearview mirror head that displays through said electrochromic mirror element.

23. The interior rearview mirror system of claim 22, wherein said display comprises a compass display.

24. The interior rearview mirror system of claim 1, wherein said pivot element comprises a ball of a ball and socket pivot joint.

25. The interior rearview mirror system of claim 1, wherein said forwardly-viewing camera at least one of (a) electrically couples to an accessory located external to said structure and (b) shares a component with an accessory located external to said structure.

26. The interior rearview mirror system of claim 25, wherein said accessory located external to said structure comprises an accessory located in said interior rearview mirror head.

27. The interior rearview mirror system of claim 1, wherein the other of said at least two accessories comprises (a) a headlamp sensor, (b) a rain sensor, (c) a camera, (d) a compass sensor, and (e) a garage door opener.

28. The interior rearview mirror system of claim 1, wherein the other of said at least two accessories comprises a rain sensor.

29. The interior rearview mirror system of claim 28, wherein said rain sensor at least one of (a) views through an aperture of said structure and through the vehicle windshield, (b) views through an aperture of said structure and views, via an opening in a light absorbing layer at the vehicle windshield that generally coincides with said aperture of said structure, through the vehicle windshield, (c) is biased at least partially through an aperture of said structure and into contact with the in-cabin surface of the vehicle windshield for viewing through the vehicle windshield, and (d) is biased at least partially through an aperture of said structure and into contact with the in-cabin surface of the vehicle windshield for viewing, via an opening in a light absorbing layer at the vehicle windshield that generally coincides with said aperture of said structure, through the vehicle windshield.

30. The interior rearview mirror system of claim 1, wherein said structure includes an internal wall that separates a cavity of said structure into first and second compartments, and wherein said forwardly-viewing camera is accommodated by said first compartment.

31. The interior rearview mirror system of claim 1, wherein at least one of (a) said attachment element at the in-cabin surface of the vehicle windshield comprises an attachment element adhesively attached at the in-cabin surface of the vehicle windshield, (b) said attachment element at the in-cabin surface of the vehicle windshield comprises a metallic attachment element adhesively attached at the in-cabin surface of the vehicle windshield, (c) said attachment element at the in-cabin surface of the vehicle windshield comprises a generally circular mirror mounting button and (d) said attachment element at the in-cabin surface of the vehicle windshield comprises an attachment element adhesively attached at the in-cabin surface of the vehicle windshield by at least one of an epoxy adhesive, a urethane adhesive, a polyvinyl butyral adhesive and a silicone adhesive.

32. The interior rearview mirror system of claim 1, wherein said attachment element is formed by metal fabrication and wherein said attachment element is adhesively attached at the in-cabin surface of the vehicle windshield.

33. The interior rearview mirror system of claim 32, wherein said metal fabrication comprises at least one of casting and sintering.

34. The interior rearview mirror system of claim 1, wherein said attachment element comprises a polymeric element adhesively attached at the in-cabin surface of the vehicle windshield.

35. The interior rearview mirror system of claim 1, wherein said attachment element is adhesively attached at the in-cabin surface of the vehicle windshield and is configured for attachment of said mount of said structure of said interior rearview mirror assembly.

36. The interior rearview mirror system of claim 1, wherein said attachment element comprises a metallic mirror mounting button adhesively attached at the in-cabin surface of the vehicle windshield.

37. The interior rearview mirror system of claim 1, wherein said forwardly-viewing camera comprises a camera module that is provided at said structure as a modular unit.

38. The interior rearview mirror system of claim 37, wherein an electrical connection is made to said camera module.

39. The interior rearview mirror system of claim 1, wherein said interior rearview mirror assembly and said forwardly-viewing camera are provided to a vehicle assembly plant by a mirror manufacturer and wherein the other of said at least two accessories is provided to the vehicle assembly plant by a separate manufacturer.

40. The interior rearview mirror system of claim 39, wherein the other accessory comprises a rain sensor.

41. The interior rearview mirror system of claim 40, wherein said interior rearview mirror assembly is configured so that electrical connection to the other accessory is readily made when the other accessory is accommodated by said structure.

42. An interior rearview mirror system for a vehicle, said interior rearview mirror system comprising:
an attachment element attached at an in-cabin surface of a vehicle windshield of the vehicle equipped with said interior rearview mirror system;
an interior rearview mirror assembly configured for attachment to said attachment element;
wherein said interior rearview mirror assembly comprises a structure that includes (i) a mount for attaching said interior rearview mirror assembly to said attachment element and (ii) a pivot element;
wherein said interior rearview mirror assembly comprises an interior rearview mirror head pivotally attached at said pivot element;
wherein said interior rearview mirror head includes an electrochromic rearview mirror element;
wherein, with said interior rearview mirror assembly attached to said attachment element, said interior rearview mirror head is adjustable by a driver of the equipped vehicle about said pivot element to adjust a rearward field of view of said electrochromic rearview mirror element;
wherein said pivot element comprises an element of a ball and socket pivot joint, wherein said pivot joint includes a passageway, wherein at least one electrical lead passes through said passageway of said pivot joint, wherein said at least one electrical lead connects to circuitry disposed in said interior rearview mirror head, and wherein said circuitry relates to at least one of (a) said electrochromic rearview mirror element and (b) a display in said interior rearview mirror head that displays through said electrochromic mirror element;
wherein, with said interior rearview mirror assembly attached to said attachment element, at least two accessories are encompassed by said structure of said interior rearview mirror assembly;
wherein, with said interior rearview mirror assembly attached to said attachment element, said structure covers said at least two accessories from view by the driver operating the equipped vehicle; and
wherein one of said at least two accessories comprises a forwardly-viewing camera and wherein, with said interior rearview mirror assembly attached to said attachment element, said forwardly-viewing camera views through the vehicle windshield.

43. The interior rearview mirror system of claim 42, wherein said structure comprises at least one of (i) a polymeric structure formed by molding and (ii) a metallic structure formed by metallic fabrication.

44. The interior rearview mirror system of claim 42, wherein, with said interior rearview mirror assembly attached to said attachment element, said structure includes at least one of (a) a portion abutting close to the in-cabin surface of the vehicle windshield and at least partially encompassing where said at least two accessories are disposed, and (b) a portion contacting the in-cabin surface of the vehicle windshield and at least partially encompassing where said at least two accessories are disposed.

45. The interior rearview mirror system of claim 42, wherein said circuitry relates to a display in said interior rearview mirror head that displays through said electrochromic mirror element, and wherein said display comprises a compass display.

46. The interior rearview mirror system of claim 42, wherein said structure comprises a detachable cover, wherein said structure comprises a metallic structure formed by metallic fabrication and wherein said detachable cover comprises a polymeric molding, and wherein said detachable cover detachably attaches to said metallic structure.

47. The interior rearview mirror system of claim 46, wherein, with said detachable cover attached at said metallic structure and with said interior rearview mirror assembly attached to said attachment element, at least one of (a) said detachable cover abuts the in-cabin surface of the vehicle windshield, (b) said detachable cover contacts the in-cabin surface of the vehicle windshield and (c) an edge portion of said detachable cover lies flat against the in-cabin surface of the vehicle windshield.

48. The interior rearview mirror system of claim 42, wherein said structure comprises a detachable cover, and wherein, with said interior rearview mirror assembly attached to said attachment element, said detachable cover is detachable to facilitate service of at least one of said at least two accessories, and wherein another of said at least two accessories comprises a rain sensor.

49. The interior rearview mirror system of claim 42, wherein said structure comprises a detachable cover, and wherein said at least two accessories form a cluster of individual sensors and wherein, with said interior rearview mirror assembly attached to said attachment element, said cluster of individual sensors resides on or near the in-cabin surface of the vehicle windshield, and wherein said detachable cover covers said cluster of individual sensors from view by the driver operating the equipped vehicle.

50. The interior rearview mirror system of claim 42, wherein a portion of said structure comprises a polymeric structure formed by molding and another portion of said structure comprises a metallic structure formed by metallic fabrication, and wherein said metallic structure comprises a die cast metallic structure.

51. The interior rearview mirror system of claim 42, wherein a portion of said structure comprises a polymeric structure formed by molding and another portion of said structure comprises a metallic structure formed by metallic fabrication, and wherein said forwardly-viewing camera is accommodated by said metallic structure, and wherein a compartment of said metallic structure accommodates said forwardly-viewing camera.

52. The interior rearview mirror system of claim 42, wherein said forwardly-viewing camera at least one of (a) electrically couples to an accessory located in said interior rearview mirror head and (b) shares a component with an accessory located in said interior rearview mirror head.

53. The interior rearview mirror system of claim 42, wherein the other of said at least two accessories comprises a rain sensor, and wherein said rain sensor at least one of (a) views through an aperture of said structure and through the vehicle windshield, (b) views through an aperture of said structure and views, via an opening in a light absorbing layer at the vehicle windshield that generally coincides with said aperture of said structure, through the vehicle windshield, (c) is biased at least partially through an aperture of said structure and into contact with the in-cabin surface of the vehicle windshield for viewing through the vehicle windshield, and (d) is biased at least partially through an aperture of said structure and into contact with the in-cabin surface of the vehicle windshield for viewing, via an opening in a light absorbing layer at the vehicle windshield that generally coincides with said aperture of said structure, through the vehicle windshield.

54. The interior rearview mirror system of claim 42, wherein said attachment element comprises a metallic mirror mounting button adhesively attached at the in-cabin surface of the vehicle windshield, and wherein said forwardly-viewing camera comprises a camera module that is provided at said structure as a modular unit.

55. The interior rearview mirror system of claim 42, wherein said interior rearview mirror assembly and said forwardly-viewing camera are provided to a vehicle assembly plant by a mirror manufacturer and wherein the other of said at least two accessories is provided to the vehicle assembly plant by a separate manufacturer, and wherein the other accessory comprises a rain sensor.

56. An interior rearview mirror system for a vehicle, said interior rearview mirror system comprising:
an attachment element attached at an in-cabin surface of a vehicle windshield of the vehicle equipped with said interior rearview mirror system;
an interior rearview mirror assembly configured for attachment to said attachment element;
wherein said interior rearview mirror assembly comprises a structure that includes (i) a mount for attaching said interior rearview mirror assembly to said attachment element and (ii) a pivot element;
wherein said interior rearview mirror assembly comprises an interior rearview mirror head pivotally attached at said pivot element;
wherein said interior rearview mirror head includes an electrochromic rearview mirror element;
wherein, with said interior rearview mirror assembly attached to said attachment element, said interior rearview mirror head is adjustable by a driver of the equipped vehicle about said pivot element to adjust a rearward field of view of said electrochromic rearview mirror element;
wherein, with said interior rearview mirror assembly attached to said attachment element, at least two accessories are encompassed by said structure of said interior rearview mirror assembly;
wherein, with said interior rearview mirror assembly attached to said attachment element, said structure covers said at least two accessories from view by the driver operating the equipped vehicle;
wherein one of said at least two accessories comprises a forwardly-viewing camera and wherein the other of said at least two accessories comprises a rain sensor;
wherein said interior rearview mirror assembly and said forwardly-viewing camera are provided to a vehicle assembly plant by a mirror manufacturer and wherein said rain sensor is provided to the vehicle assembly plant by a separate manufacturer;
wherein, with said interior rearview mirror assembly attached to said attachment element, said forwardly-viewing camera views through the vehicle windshield; and
wherein said rain sensor at least one of (a) views through an aperture of said structure and through the vehicle windshield, (b) views through an aperture of said structure and views, via an opening in a light absorbing layer at the vehicle windshield that generally coincides with said aperture of said structure, through the vehicle windshield, (c) is biased at least partially through an aperture of said structure and into contact with the in-cabin surface of the vehicle windshield for viewing through the vehicle windshield, and (d) is biased at least partially through an aperture of said structure and into contact with the in-cabin surface of the vehicle windshield for viewing, via an opening in a light absorbing layer at the vehicle windshield that generally coincides with said aperture of said structure, through the vehicle windshield.

57. The interior rearview mirror system of claim 56, wherein said pivot element comprises an element of a ball and socket pivot joint, wherein said pivot joint includes a passageway, wherein at least one electrical lead passes through said passageway of said pivot joint, wherein said at least one electrical lead connects to circuitry disposed in said interior rearview mirror head, and wherein said circuitry relates to at least one of (a) said electrochromic rearview mirror element and (b) a display in said interior rearview mirror head that displays through said electrochromic mirror element.

58. The interior rearview mirror system of claim 56, wherein said structure comprises a detachable cover, wherein said structure comprises a metallic structure formed by metallic fabrication and wherein said detachable cover comprises a polymeric molding, and wherein said detachable cover detachably attaches to said metallic structure.

59. The interior rearview mirror system of claim 58, wherein, with said detachable cover attached at said metallic structure and with said interior rearview mirror assembly attached to said attachment element, at least one of (a) said detachable cover abuts the in-cabin surface of the vehicle windshield, (b) said detachable cover contacts the in-cabin surface of the vehicle windshield and (c) an edge portion of said detachable cover lies flat against the in-cabin surface of the vehicle windshield.

60. The interior rearview mirror system of claim 56, wherein said structure comprises a detachable cover, and wherein, with said interior rearview mirror assembly attached to said attachment element, said detachable cover is detachable to facilitate service of at least one of said at least two accessories.

61. The interior rearview mirror system of claim 56, wherein said structure comprises a detachable cover, and wherein said at least two accessories form a cluster of individual sensors and wherein, with said interior rearview mirror assembly attached to said attachment element, said cluster of individual sensors resides on or near the in-cabin surface of the vehicle windshield, and wherein said detachable cover covers said cluster of individual sensors from view by the driver operating the equipped vehicle.

62. The interior rearview mirror system of claim 56, wherein said forwardly-viewing camera at least one of (a) electrically couples to an accessory located in said interior rearview mirror head and (b) shares a component with an accessory located in said interior rearview mirror head.

63. An interior rearview mirror system for a vehicle, said interior rearview mirror system comprising:
   an attachment element attached at an in-cabin surface of a vehicle windshield of the vehicle equipped with said interior rearview mirror system;
   an interior rearview mirror assembly configured for attachment to said attachment element;
   wherein said interior rearview mirror assembly comprises a structure that includes (i) a mount for attaching said interior rearview mirror assembly to said attachment element and (ii) a pivot element;
   wherein said structure comprises a detachable cover, wherein said structure comprises a metallic structure formed by metallic fabrication and wherein said detachable cover comprises a polymeric molding, and wherein said detachable cover detachably attaches to said metallic structure;
   wherein said interior rearview mirror assembly comprises an interior rearview mirror head pivotally attached at said pivot element;
   wherein said interior rearview mirror head includes an electrochromic rearview mirror element;
   wherein, with said interior rearview mirror assembly attached to said attachment element, said interior rearview mirror head is adjustable by a driver of the equipped vehicle about said pivot element to adjust a rearward field of view of said electrochromic rearview mirror element;
   wherein said pivot element comprises an element of a ball and socket pivot joint, wherein said pivot joint includes a passageway, wherein at least one electrical lead passes through said passageway of said pivot joint, wherein said at least one electrical lead connects to circuitry disposed in said interior rearview mirror head;
   wherein, with said interior rearview mirror assembly attached to said attachment element, at least two accessories are encompassed by said structure of said interior rearview mirror assembly;
   wherein, with said interior rearview mirror assembly attached to said attachment element, said structure covers said at least two accessories from view by the driver operating the equipped vehicle;
   wherein one of said at least two accessories comprises a forwardly-viewing camera and wherein the other of said at least two accessories comprises a rain sensor;
   wherein, with said interior rearview mirror assembly attached to said attachment element, said forwardly-viewing camera views through the vehicle windshield; and
   wherein said rain sensor at least one of (a) views through an aperture of said structure and through the vehicle windshield, (b) views through an aperture of said structure and views, via an opening in a light absorbing layer at the vehicle windshield that generally coincides with said aperture of said structure, through the vehicle windshield, (c) is biased at least partially through an aperture of said structure and into contact with the in-cabin surface of the vehicle windshield for viewing through the vehicle windshield, and (d) is biased at least partially through an aperture of said structure and into contact with the in-cabin surface of the vehicle windshield for viewing, via an opening in a light absorbing layer at the vehicle windshield that generally coincides with said aperture of said structure, through the vehicle windshield.

64. The interior rearview mirror system of claim 63, wherein said interior rearview mirror assembly and said forwardly-viewing camera are provided to a vehicle assembly plant by a mirror manufacturer and wherein said rain sensor is provided to the vehicle assembly plant by a separate manufacturer.

65. The interior rearview mirror system of claim 63, wherein, with said detachable cover attached at said metallic structure and with said interior rearview mirror assembly attached to said attachment element, at least one of (a) said detachable cover abuts the in-cabin surface of the vehicle windshield, (b) said detachable cover contacts the in-cabin surface of the vehicle windshield and (c) an edge portion of said detachable cover lies flat against the in-cabin surface of the vehicle windshield.

66. The interior rearview mirror system of claim 63, wherein, with said interior rearview mirror assembly attached to said attachment element, said detachable cover is detachable to facilitate service of at least one of said at least two accessories.

67. The interior rearview mirror system of claim 63, wherein said at least two accessories form a cluster of individual sensors and wherein, with said interior rearview mirror assembly attached to said attachment element, said cluster of individual sensors resides on or near the in-cabin, surface of the vehicle windshield, and wherein said detachable cover covers said cluster of individual sensors from view by the driver operating the equipped vehicle.

68. The interior rearview mirror system of claim 63, wherein said forwardly-viewing camera at least one of (a) electrically couples to an accessory located in said interior rearview mirror head and (b) shares a component with an accessory located in said interior rearview mirror head.

69. The interior rearview mirror system of claim 63, wherein said circuitry relates to at least one of (a) said electrochromic rearview mirror element and (b) a display in said interior rearview mirror head that displays through said electrochromic mirror element.

70. An interior rearview mirror system for a vehicle, said interior rearview mirror system comprising:

an attachment element attached at an in-cabin surface of a vehicle windshield of the vehicle equipped with said interior rearview mirror system;

an interior rearview mirror assembly configured for attachment to said attachment element;

wherein said interior rearview mirror assembly comprises a structure that includes (i) a mount for attaching said interior rearview mirror assembly to said attachment element and (ii) a pivot element;

wherein said interior rearview mirror assembly comprises an interior rearview mirror head pivotally attached at said pivot element;

wherein said interior rearview mirror head includes an electrochromic rearview mirror element;

wherein, with said interior rearview mirror assembly attached to said attachment element, said interior rearview mirror head is adjustable by a driver of the equipped vehicle about said pivot element to adjust a rearward field of view of said electrochromic rearview mirror element;

wherein said pivot element comprises an element of a ball and socket pivot joint, wherein said pivot joint includes a passageway, wherein at least one electrical lead passes through said passageway of said pivot joint, wherein said at least one electrical lead connects to circuitry disposed in said interior rearview mirror head, and wherein said circuitry relates to at least one of (a) said electrochromic rearview mirror element and (b) a display in said interior rearview mirror head that displays through said electrochromic mirror element;

wherein, with said interior rearview mirror assembly attached to said attachment element, a forwardly-viewing camera is encompassed by said structure of said interior rearview mirror assembly and wherein, with said interior rearview mirror assembly attached to said attachment element, said forwardly-viewing camera views through the vehicle windshield;

wherein said structure comprises at least one of (i) a polymeric structure formed by molding and (ii) a metallic structure formed by metallic fabrication; and wherein, with said interior rearview mirror assembly attached to said attachment element, said structure includes at least one of (a) a portion abutting close to the in-cabin surface of the vehicle windshield and at least partially encompassing where said forwardly-viewing camera is disposed, and (b) a portion contacting the in-cabin surface of the vehicle windshield and at least partially encompassing where said forwardly-viewing camera is disposed.

71. The interior rearview mirror system of claim 70, wherein said forwardly-viewing camera at least one of (a) electrically couples to an accessory located in said interior rearview mirror head and (b) shares a component with an accessory located in said interior rearview mirror head.

72. The interior rearview mirror system of claim 70, wherein said structure includes a detachable cover and wherein, with said interior rearview mirror assembly attached to said attachment element, said detachable cover is detachable to facilitate service of said forwardly-viewing camera.

73. The interior rearview mirror system of claim 70, wherein said structure comprises a die cast metallic structure.

74. The interior rearview mirror system of claim 70, wherein, with said interior rearview mirror assembly attached to said attachment element, said structure covers another accessory located at or on said in-cabin surface of the vehicle windshield from view by the driver operating the equipped vehicle.

75. The interior rearview mirror system of claim 74, wherein said structure includes a detachable cover and wherein, with said interior rearview mirror assembly attached to said attachment element, said detachable cover is detachable to facilitate service of at least one of said forwardly-viewing camera and said other accessory.

76. An interior rearview mirror system for a vehicle, said interior rearview mirror system comprising:

an attachment element attached at an in-cabin surface of a vehicle windshield of the vehicle equipped with said interior rearview mirror system;

an interior rearview mirror assembly configured for attachment to said attachment element;

wherein said interior rearview mirror assembly comprises a structure that includes (i) a mount for attaching said interior rearview mirror assembly to said attachment element and (ii) a pivot element;

wherein said interior rearview mirror assembly comprises an interior rearview mirror head pivotally attached at said pivot element;

wherein said interior rearview mirror head includes an electrochromic rearview mirror element;

wherein, with said interior rearview mirror assembly attached to said attachment element, said interior rearview mirror head is adjustable by a driver of the equipped vehicle about said pivot element to adjust a rearward field of view of said electrochromic rearview mirror element;

wherein said pivot element comprises an element of a ball and socket pivot joint, and wherein said pivot joint includes a passageway, and wherein at least one electrical lead passes through said passageway of said pivot joint, and wherein said at least one electrical lead connects to circuitry disposed in said interior rearview mirror head, and wherein said circuitry relates to at least one of (a) said electrochromic rearview mirror element and (b) a display in said interior rearview mirror head that displays through said electrochromic mirror element;

wherein, with said interior rearview mirror assembly attached to said attachment element, at least two accessories are encompassed by said structure of said interior rearview mirror assembly;

wherein said structure comprises at least one of (i) a polymeric structure formed by molding and (ii) a metallic structure formed by metallic fabrication;

wherein, with said interior rearview mirror assembly attached to said attachment element, said structure covers said at least two accessories from view by the driver operating the equipped vehicle;

wherein, with said interior rearview mirror assembly attached to said attachment element, said structure includes at least one of (a) a portion abutting close to the in-cabin surface of the vehicle windshield and at least partially encompassing where said at least two accessories are disposed, and (b) a portion contacting the in-cabin surface of the vehicle windshield and at least partially encompassing where said at least two accessories are disposed;

wherein one of said at least two accessories comprises a forwardly-viewing camera and wherein the other of said at least two accessories comprises a rain sensor;

wherein said interior rearview mirror assembly and said forwardly-viewing camera are provided to a vehicle assembly plant by a mirror manufacturer and wherein said rain sensor is provided to the vehicle assembly plant by a separate manufacturer; and wherein, with said interior rearview mirror assembly attached to said attachment element, said forwardly-viewing camera views through the vehicle windshield.

77. The interior rearview mirror system of claim 76, wherein, with said interior rearview mirror assembly attached to said attachment element, said structure covers said rain sensor from view by the driver operating the equipped vehicle.

78. The interior rearview mirror system of claim 76, wherein said structure includes a detachable cover and wherein, with said interior rearview mirror assembly attached to said attachment element, said detachable cover is detachable to facilitate service of at least one of said forwardly-viewing camera and said rain sensor.

79. An interior rearview mirror system for a vehicle, said interior rearview mirror system comprising:

an attachment element attached at an in-cabin surface of a vehicle windshield of the vehicle equipped with said interior rearview mirror system;

an interior rearview mirror assembly configured for attachment to said attachment element;

wherein said interior rearview mirror assembly comprises a structure that includes (i) a mount for attaching said interior rearview mirror assembly to said attachment element (ii) a pivot element and (iii) a detachable cover;

wherein said interior rearview mirror assembly comprises an interior rearview mirror head pivotally attached at said pivot element;

wherein said interior rearview mirror head includes an electrochromic rearview mirror element;

wherein, with said interior rearview mirror assembly attached to said attachment element, said interior rearview mirror head is adjustable by a driver of the equipped vehicle about said pivot element to adjust a rearward field of view of said electrochromic rearview mirror element;

wherein said pivot element comprises an element of a ball and socket pivot joint, and wherein said pivot joint includes a passageway, and wherein at least one electrical lead passes through said passageway of said pivot joint, and wherein said at least one electrical lead connects to circuitry disposed in said interior rearview mirror head;

wherein, with said interior rearview mirror assembly attached to said attachment element, at least two accessories are encompassed by said structure of said interior rearview mirror assembly;

wherein, with said interior rearview mirror assembly attached to said attachment element, said structure covers said at least two accessories from view by the driver operating the equipped vehicle;

wherein, with said interior rearview mirror assembly attached to said attachment element, said structure includes at least one of (a) a portion abutting close to the in-cabin surface of the vehicle windshield and at least partially encompassing where said at least two accessories are disposed, and (b) a portion contacting the in-cabin surface of the vehicle windshield and at least partially encompassing where said at least two accessories are disposed;

wherein said at least two accessories form a cluster of individual sensors and wherein, with said interior rearview mirror assembly attached to said attachment element, said cluster of individual sensors resides on or near the in-cabin surface of the vehicle windshield, and wherein said detachable cover covers said cluster from view by the driver operating the equipped vehicle; and wherein one of said at least two accessories comprises a forwardly-viewing camera and wherein, with said interior rearview mirror assembly attached to said attachment element, said forwardly-viewing camera views through the vehicle windshield.

80. The interior rearview mirror system of claim 79, wherein, with said interior rearview mirror assembly attached to said attachment element, said detachable cover is detachable to facilitate service of at least one of said at least two accessories.

81. The interior rearview mirror system of claim 80, wherein said structure comprises a metallic structure and wherein, with said detachable cover attached at said metallic structure and with said interior rearview mirror assembly attached to said attachment element, a rain sensor is covered by said detachable cover from view by the driver operating the equipped vehicle.

82. The interior rearview mirror system of claim 81, wherein said circuitry relates to at least one of (a) said electrochromic rearview mirror element and (b) a display in said interior rearview mirror head that displays through said electrochromic mirror element.

* * * * *

UNITED STATES PATENT AND TRADEMARK OFFICE
CERTIFICATE OF CORRECTION

| | | |
|---|---|---|
| PATENT NO. | : 7,994,471 B2 | Page 1 of 1 |
| APPLICATION NO. | : 13/026591 | |
| DATED | : August 9, 2011 | |
| INVENTOR(S) | : Patrick Heslin and Niall R. Lynam | |

It is certified that error appears in the above-identified patent and that said Letters Patent is hereby corrected as shown below:

Column 3
Line 43, "fit" should be --frit--

Column 9
Line 46, "clay." should be --day.--
Line 66, "aim" should be --arm--

Signed and Sealed this
Twenty-eighth Day of February, 2012

David J. Kappos
*Director of the United States Patent and Trademark Office*